United States Patent
Feit et al.

(10) Patent No.: US 9,650,041 B2
(45) Date of Patent: May 16, 2017

(54) PREDICTIVE HUMAN-MACHINE INTERFACE USING EYE GAZE TECHNOLOGY, BLIND SPOT INDICATORS AND DRIVER EXPERIENCE

(75) Inventors: Steven Feit, Raymond, OH (US); Nick Scheufler, Raymond, OH (US); Dave Choi, Raymond, OH (US); Michelle Kosterich, Raymond, OH (US); Ross Miller, Raymond, OH (US); Cody Grebe, Raymond, OH (US); Jason Lin, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/515,249

(22) PCT Filed: Dec. 9, 2010

(86) PCT No.: PCT/US2010/059713
§ 371 (c)(1),
(2), (4) Date: Jun. 11, 2012

(87) PCT Pub. No.: WO2011/075392
PCT Pub. Date: Jun. 23, 2011

(65) Prior Publication Data
US 2012/0271484 A1 Oct. 25, 2012

Related U.S. Application Data

(60) Provisional application No. 61/288,200, filed on Dec. 18, 2009.

(51) Int. Cl.
*G05D 1/00* (2006.01)
*G05D 3/00* (2006.01)
(Continued)

(52) U.S. Cl.
CPC ........ *B60W 30/0956* (2013.01); *B60W 30/09* (2013.01); *B60W 50/14* (2013.01);
(Continued)

(58) Field of Classification Search
USPC .................................................... 701/1, 301
See application file for complete search history.

(56) References Cited

U.S. PATENT DOCUMENTS 6,154,559 A 11/2000 Beardsley
6,859,144 B2 * 2/2005 Newman et al. ............. 340/576
(Continued)

FOREIGN PATENT DOCUMENTS

CN 101295355 A 10/2008
CN 101500874 A 8/2009
(Continued)

OTHER PUBLICATIONS

PCT International Search Report and Written Opinion, PCT Application No. US/2010/059713, Jan. 24, 2011, ten pages.
(Continued)

*Primary Examiner* — Imran Mustafa
(74) *Attorney, Agent, or Firm* — Rankin, Hill & Clark LLP

(57) ABSTRACT

A system and method are disclosed for preventing accidents in a vehicle. The system comprises an eye gaze detector for receiving an eye gaze vector from a driver. The system additionally comprises a proximity sensor for detecting locations of nearby objects and their velocities. A vehicle accident risk is determined based on the nearby object location and velocity. Additionally, the driver's knowledge of vehicle circumstances is determined based on the nearby object location and velocity as well as the eye gaze location. Responsive to the driver's knowledge and the vehicle accident risk, a vehicle alert is activated.

20 Claims, 26 Drawing Sheets

Vehicle Layout Image

Circuit Image

(51) Int. Cl.
*G06F 7/00* (2006.01)
*G06F 17/00* (2006.01)
*G06F 17/10* (2006.01)
*G06G 7/78* (2006.01)
*G08G 1/16* (2006.01)
*B60W 30/095* (2012.01)
*B60W 30/09* (2012.01)
*B60W 50/14* (2012.01)
*G06K 9/00* (2006.01)
*B60W 10/18* (2012.01)

(52) U.S. Cl.
CPC ..... *G06K 9/00597* (2013.01); *G06K 9/00845* (2013.01); *B60W 10/18* (2013.01)

(56) References Cited

U.S. PATENT DOCUMENTS

| | | | |
|---|---|---|---|
| 6,906,619 B2 * | 6/2005 | Williams et al. | 340/425.5 |
| 6,927,674 B2 | 8/2005 | Harter, Jr. et al. | |
| 6,974,414 B2 | 12/2005 | Victor | |
| 6,989,754 B2 | 1/2006 | Kisacanin et al. | |
| 7,206,435 B2 | 4/2007 | Fujimura et al. | |
| 7,460,940 B2 | 12/2008 | Larsson et al. | |
| 7,570,785 B2 | 8/2009 | Breed | |
| 7,579,942 B2 | 8/2009 | Kalik | |
| 7,639,148 B2 | 12/2009 | Victor | |
| 2003/0169213 A1 * | 9/2003 | Spero | G02B 5/20 345/7 |
| 2004/0150514 A1 * | 8/2004 | Newman | B60Q 9/008 340/435 |
| 2004/0239509 A1 * | 12/2004 | Kisacanin | A61B 5/18 340/575 |
| 2005/0073136 A1 | 4/2005 | Larsson et al. | |
| 2005/0209749 A1 | 9/2005 | Ito et al. | |
| 2006/0287787 A1 | 12/2006 | Engstrom et al. | |
| 2007/0014431 A1 | 1/2007 | Hammoud | |
| 2007/0213883 A1 * | 9/2007 | Clarke | B60T 7/22 701/1 |
| 2008/0042813 A1 * | 2/2008 | Wheatley et al. | 340/435 |
| 2008/0267600 A1 | 10/2008 | Omi | |
| 2008/0291000 A1 | 11/2008 | Kim et al. | |
| 2008/0292151 A1 * | 11/2008 | Kurtz et al. | 382/128 |
| 2010/0025144 A1 * | 2/2010 | Huang | B62D 5/008 180/401 |
| 2010/0033333 A1 * | 2/2010 | Victor | A61B 3/113 340/576 |
| 2010/0253598 A1 * | 10/2010 | Szczerba | G01S 13/723 345/7 |
| 2011/0284304 A1 * | 11/2011 | Van Schoiack | 180/272 |

FOREIGN PATENT DOCUMENTS

| | | |
|---|---|---|
| EP | 1 732 028 A1 | 12/2006 |
| JP | 11-339199 | 12/1999 |
| JP | 2001-163082 A | 6/2001 |
| JP | 2001-357498 A | 12/2001 |
| JP | 2008-222055 | 9/2008 |
| JP | 2009-211498 A | 9/2009 |

OTHER PUBLICATIONS

Fletcher, L., et al., "Correlating driver gaze with the road scene for driver assistance systems," Robotics and Autonomous Systems, vol. 52, pp. 71-84, 2005.

Fletcher, L., et al., "Vision in and out of Vehicles," IEEE Intelligent Systems, vol. 18, No. 3, pp. 12-17, 2003.

Patent Office of the Russian Federation, Official Action, Russian Patent Application No. 2012130445, Jun. 10, 2013, six pages European Patent Office, Examination Report, European Patent Application No. 10838148.4, May 17, 2013, six pages.

State Intellectual Property Office, First Office Action, Chinese Patent Application No. 201080057617.7, Apr. 17, 2014, six pages.

State Intellectual Property Office, First Office Action, Chinese Patent Application No. 201080057617.7, Sep. 5, 2013, twenty-five pages.

Office Action for Japanese Patent Application No. 2012-544646, Jun. 22, 2015, 17 Pages.

Japan Patent Office, Office Action, Japanese Patent Application No. 2012-544646, Sep. 30, 2014, ten pages.

State Intellectual Property Office of the People's Republic of China, Third Office Action, Chinese Patent Application No. 201080057617.7, Aug. 13, 2014, eight pages.

* cited by examiner

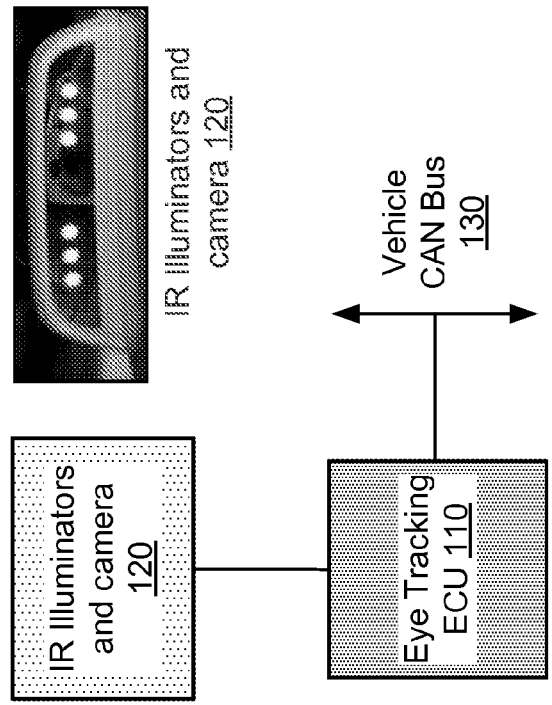
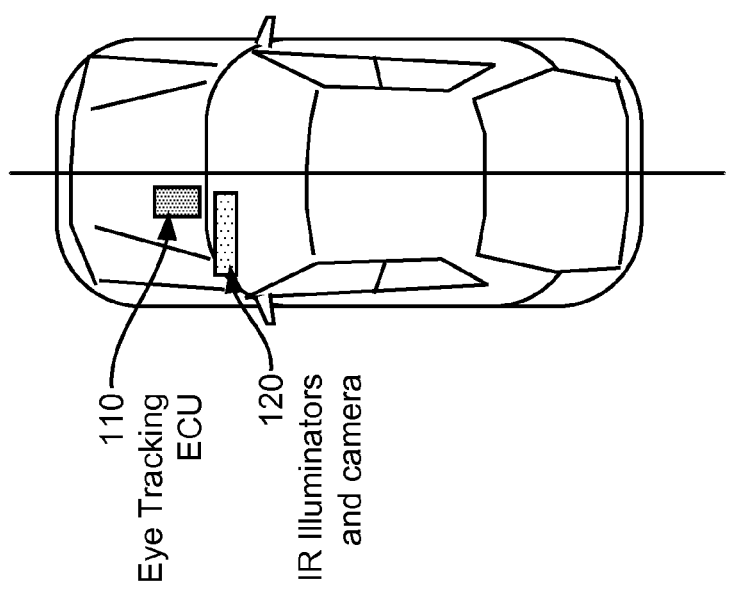
Figure 1

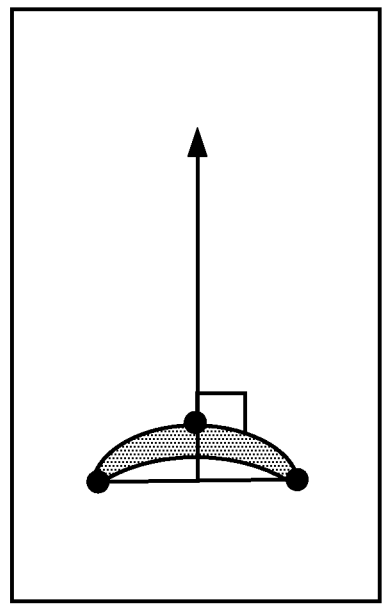
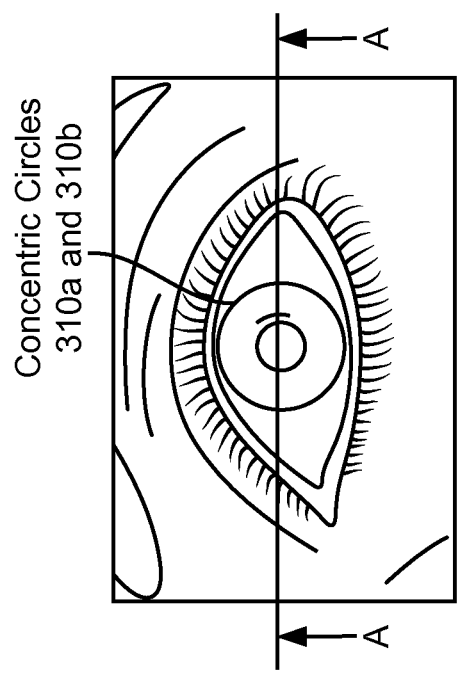
Figure 3

System Configuration
Vehicle Layout Image
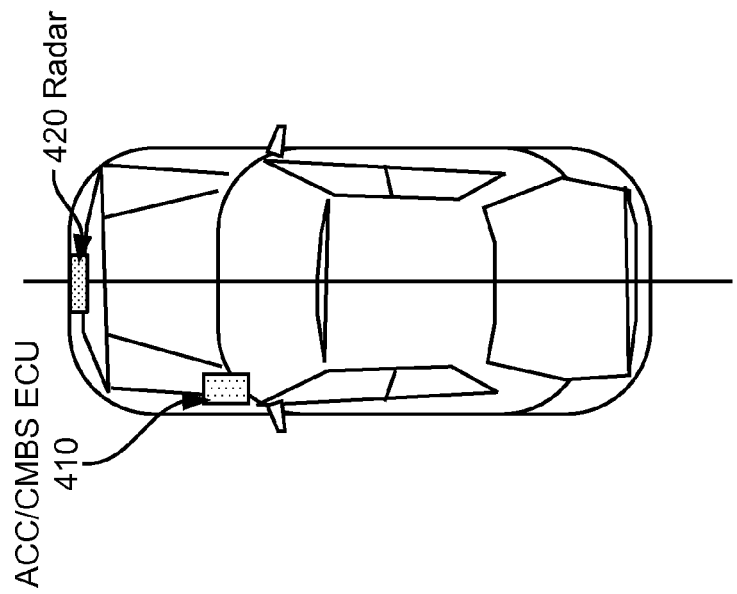
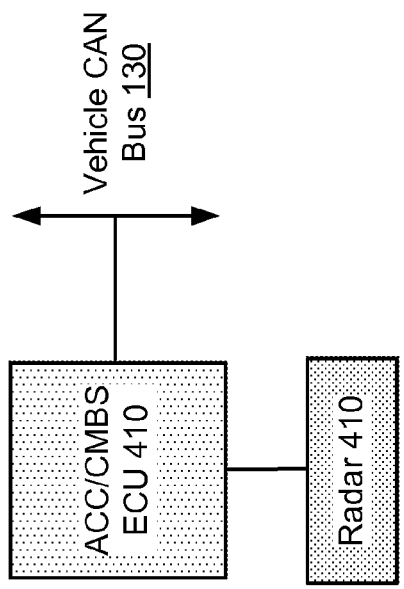
Figure 4

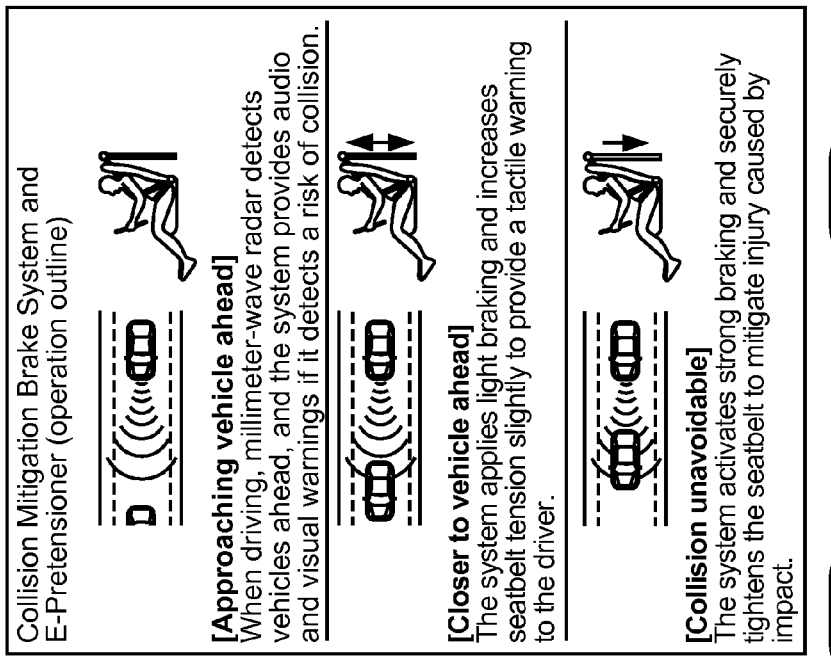
Figure 5

System Configuration
Vehicle Layout Image
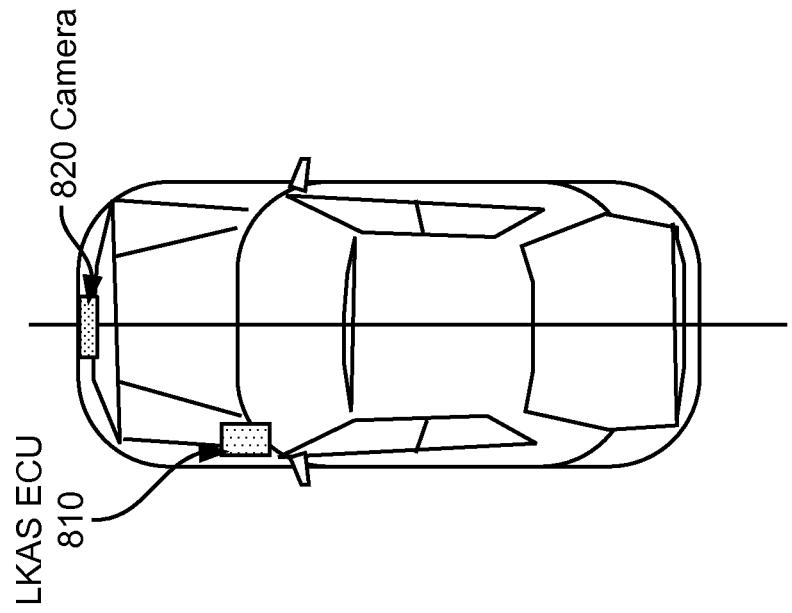
Circuit Image
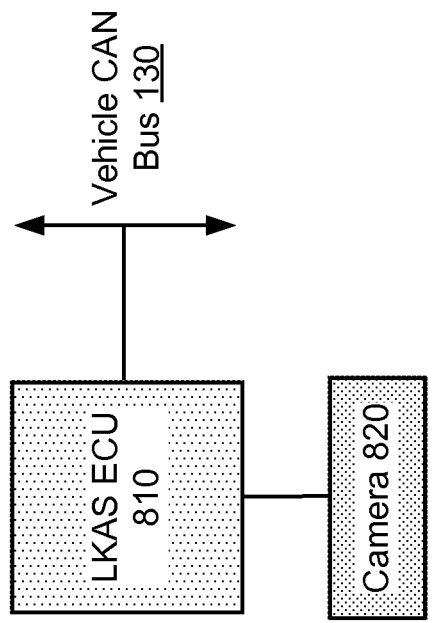
Figure 8

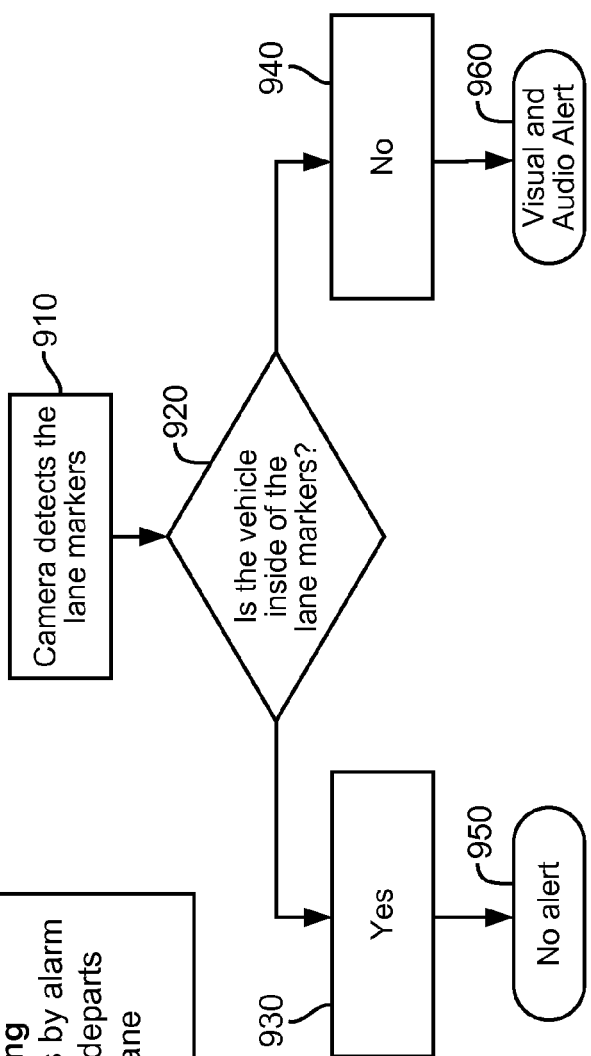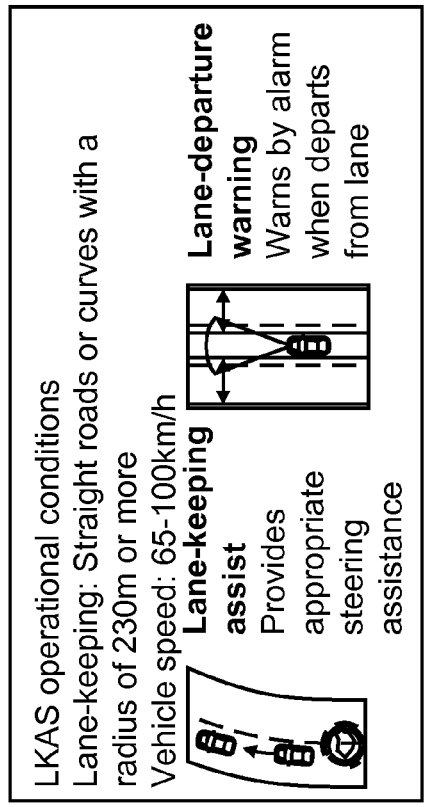
Figure 9

| Alert type | Indicator (Daytime) | Indicator (Nighttime) | Audible |
|---|---|---|---|
| 1552 Alert type #1 - Driver's side Alarm and flash | 500 cd/m2 / 0 cd/m2, 4Hz | 120 cd/m2 / 0 cd/m2, 4Hz | Alert tone from these speakers |
| 1553 Alert type #2 - Solid light | 300 cd/m2 / 0 cd/m2 | 80 cd/m2 / 0 cd/m2 | No sound |
| 1554 Alert type #3 - Flash | 500 cd/m2 / 0 cd/m2, 4Hz | 120 cd/m2 / 0 cd/m2, 4Hz | No sound |
| 1557 Alert type #4 - Flash and driver's side tone | 500 cd/m2 / 0 cd/m2, 4Hz | 120 cd/m2 / 0 cd/m2, 4Hz | Warning tone from these speakers |
| 1560 Alert type #5 - Passenger's side alarm and flash | 500 cd/m2 / 0 cd/m2, 4Hz | 120 cd/m2 / 0 cd/m2, 4Hz | Alert tone from these speakers |
| 1563 Alert type #6 - Flash and passenger's side tone | 500 cd/m2 / 0 cd/m2, 4Hz | 120 cd/m2 / 0 cd/m2, 4Hz | Warning tone from these speakers |

Figure 21

PREDICTIVE HUMAN-MACHINE INTERFACE USING EYE GAZE TECHNOLOGY, BLIND SPOT INDICATORS AND DRIVER EXPERIENCE

RELATED APPLICATIONS

This application claims the benefit of U.S. Provisional Application No. 61/288,200, filed Dec. 18, 2009 the content of which is incorporated by reference herein in its entirety.

FIELD OF THE INVENTION

The exemplary embodiments relate to the field of automobile human-machine interfaces and more particularly to a predictive human-machine interface using eye gaze technology, blind spot indicators and driver experience information.

BACKGROUND OF THE INVENTION

Automobile safety consistently remains a cause for concern amongst automobile manufacturers and consumers. Although modern cars contain numerous advances designed to increase occupant safety, the driver's actions are often the ultimate arbiter of whether a car accident results in injury to the occupants. In order to address this issue, manufacturers have recently begun to include accident prevention systems in their car designs in an attempt to mitigate driver error and prevent the occurrence of accidents, rather than relying on post-accident safety measures. Accident prevention systems range in functionality from merely warning drivers of an imminent accident, to taking control of the vehicle to actively prevent or mitigate the accident.

Accident prevention systems, however, have inherent problems which have prevented their widespread adoption. Accident prevention systems by nature interfere with the driver's control of a car. As such, the driver's interpretation of the circumstances surrounding the vehicle is replaced or altered by the car's own interpretation of the same events. Existing accident prevention systems, however, have access to far less information than a competent driver. As a result, existing accident prevention systems are prone to providing warnings of accidents that a driver knows will not occur.

More frequently, the lack of information about the car's circumstances causes an accident prevention system to provide a warning of a dangerous driving situation of which the driver is already aware. Existing accident prevention systems have no way of knowing what the driver knows about the car's circumstances. In many cases, a driver does not need to be warned about a possibly dangerous driving situation they have already recognized may occur. As a result, existing accident prevention systems provide more warnings than are necessary, and thus are annoying to drivers. As a result, many car owners with such systems may ignore or disable entirely the accident prevention systems, thereby nullifying their effectiveness.

SUMMARY OF THE INVENTION

One embodiment of the present invention comprises a predictive human machine interface for accident prevention. This human machine interface comprises an accident prevention system and an eye gaze detection system. Together, the accident prevention system and eye gaze detection system allow for complex determinations of proper responses to dangerous driving situations. The eye gaze detection system provides eye gaze vector information indicating a determination of the location of the driver's gaze to the accident prevention system. From the eye gaze vector information, the accident prevention system can determine the driver's knowledge of current driving circumstances. The accident prevention system can then provide the appropriate response (e.g., in the form of an alert or warning) to the potential vehicle accident based on the car's circumstances and the previously determined driver's knowledge of the vehicle's circumstances.

If the risk posed by the vehicle's current circumstances of the car are low, and the driver is determined to be aware of those risks, then the accident prevention system may take little to no action. As the risk of the accident increases, the accident prevention system may provide an alert which varies in type depending upon the risk. The type of alert also depends on the driver's awareness of the vehicle's circumstances. In cases where the driver is determined to have no knowledge of the cars circumstances and there is a high risk of accident, the type of alert chosen has an audio and/or visual component tailored to inform the user of the vehicle accident risk in order to prevent the accident. Additionally, in some embodiments the accident prevention system may also take active control of the car to prevent an accident, particularly in the case immediately above where the risk of accident is highest and it is determined the driver is unaware of the risk.

In specific embodiments of the invention, the accident prevention system comprises car environment sensors configured to detect particular nearby objects (e.g., vehicles) in order to detect dangerous driving situations. In some embodiments, the car environment sensors comprise proximity sensors to determine whether the car has another car immediately in front of it. The accident prevention system then warns or takes action to the car from causing a rear-end collision with the car in front it. In other embodiments, the proximity sensors are used to warn or adjust the car's direction of travel in order to keep the car in the current lane. In other embodiments, the proximity sensors detect cars in nearby lanes and indicate whether it is safe for the car to turn or change lanes.

In other embodiments, the accident prevention system is supplemented with a driver experience module. The driver experience module is configured to collect driver experience information, and to use that information to determine a driver's level of driving experience. The driver's level of driving experience is used to adjust the behavior of the accident prevention system. If a driver is determined to have a high level of driving experience, the accident prevention system will display fewer alerts and take a less active role in driving correction. Correspondingly, if a driver is determined to have a low level of driving experience, the accident prevention system will display more alerts and will take a more active role in driving correction.

An advantage of one embodiment of the present invention is that it incorporates the driver's knowledge of a vehicle's current circumstances in determining what kind of accident prevention response to provide. This results in better tailored alerts that will be more effective in reducing the frequency and severity of car accidents. Additionally, better tailored alerts will likely cause drivers to find the alerts helpful rather than annoying. Consequently, drivers will be less inclined to deactivate accident prevention systems, increasing their adoption.

The features and advantages described in the specification are not all inclusive and, in particular, many additional features and advantages will be apparent to one of ordinary skill in the art in view of the drawings and specification.

Moreover, it should be noted that the language used in the specification has been principally selected for readability and instructional purposes, and may not have been selected to delineate or circumscribe the inventive subject matter.

BRIEF DESCRIPTION OF THE DRAWINGS

FIGS. 1-3 describe one embodiment of an eye gaze detection system that provides a determination of where the driver is looking to the accident prevention system.

FIG. 4 illustrates a system configuration of a crash mitigation braking system (CMBS) in accordance with one embodiment.

FIG. 5 illustrates an example of the operation of a collision mitigation braking system in accordance with one embodiment.

FIG. 8 illustrates a vehicle layout and circuit for a predictive HMI using a lane keeping assist system (LKAS) in accordance with one embodiment.

FIG. 9 is a flowchart of existing lane keeping assist systems where eye gaze technology is not used.

FIG. 21 summarizes various types of alerts that can be used in a blind spot indication system operating in conjunction with an eye gaze detection system in accordance with one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A feature of one embodiment is a predictive human machine interface (HMI) for accident prevention. This human machine interface comprises an accident prevention system and an eye gaze detection system. Together, the accident prevention system and eye gaze detection system allow for complex determinations of proper responses to dangerous driving situations.

Eye Gaze Detection System

Figure 2:
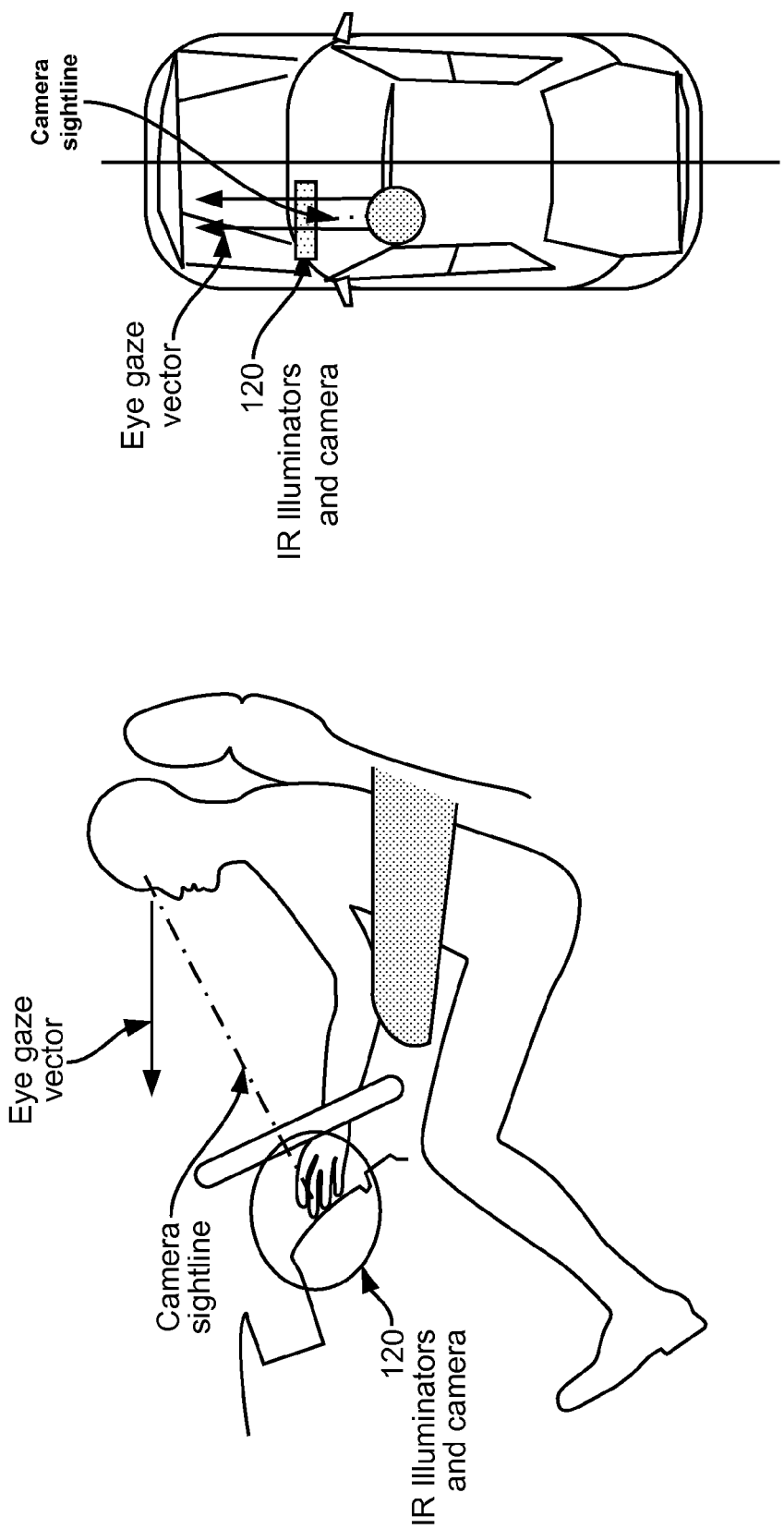

FIGS. 1-3 describe one embodiment of an eye gaze detection system that provides a determination of where the driver is looking to the accident prevention system. FIG. 1 illustrates the eye gaze detection system in accordance with one embodiment. The eye gaze detection system comprises an eye tracking computation unit (or eye tracking electronic control unit (ECU)) 110, infrared (IR) illuminators 120, and a camera 120. All of these elements are electrically coupled together. The eye tracking ECU 110 is configured to control the IR illuminators and camera 120 in order to capture eye gaze data. The eye tracking ECU 110 is additionally configured to perform calculation on eye gaze data received from the camera 120 in order to determine an eye gaze vector indicating the location of the driver's gaze. The eye gaze vector may be communicated to other parts of the vehicle, notably the accident prevention system, over a vehicle CAN bus 130.

U.S. Pat. No. 7,206,435, which is incorporated by reference herein in its entirety, describes a system and method for eye gaze detection. An eye gaze detection system can be constructed in a number of different manners, and this patent provides one example of how such a system could be constructed. In some embodiments, the eye tracking ECU 110 is additionally configured to correlate the eye gaze vector to interior vehicle locations (e.g., that the driver is looking at the passenger, or in the rear view mirror). In one embodiment, the eye tracking ECU 110 is constructed using a processor having storage and/or memory capable of storing computer program instructions that when executed by a processor perform various functions described herein. In some embodiments, the eye tracking ECU 110 is part of a vehicle's electronic control unit (ECU). The "Smart Eye Pro 5.0" white paper, which is incorporated by reference herein in its entirety, also describes a device for eye gaze detection which may be used in accordance with another embodiment of the invention.

The IR illuminators and camera 120 are used to create and receive (respectively) eye gaze data, and to provide the eye gaze data to the eye tracking ECU. In the example embodiment of FIG. 1, they IR illuminators and camera 120 are attached together, however in other embodiments they may be separate. In one embodiment, the camera 120 is configured to operate in the IR electromagnetic frequency range. In some embodiments, more than one such camera is used. The eye tracking ECU 110 uses the eye gaze data to determine the eye gaze vector. In some embodiment the camera of the eye gaze detection system can see through various types of eyewear in various lighting conditions in order to clearly track the eye position of the driver. In some embodiments other types of systems are used to detect the direction that the driver is using and non-infra-red light can be used, for example.

FIG. 2 illustrates an example of the eye gaze detection system in operation in a vehicle in accordance with one embodiment. In one embodiment, the IR illuminators and camera(s) 120 are positioned on the dashboard, steering column, and/or steering wheel, although it is envisioned that other positions can also be used. FIG. 2 illustrates the camera sightline and a sample eye gaze vector for a particular embodiment.

FIG. 3 illustrates an example of how eye gaze technology functions in accordance with one embodiment. In one embodiment, two concentric circles 310a and 310b are used to calculate the eye center point and the starting plane for the gaze vector.

Accident Prevention System in Conjunction with Eye Gaze Detection

The accident prevention system of the predictive human machine interface uses eye gaze vector information from the eye gaze detection system to increase the complexity of its decision making process. Eye gaze vector information allows the accident prevention system to tailor its response, in the forms of alerts or active car control, based in part on a determination of whether the driver is aware of dangerous driving circumstances. The accident prevention system comprises different kinds of proximity sensors (e.g., radar located at different parts of the vehicles) that detect a vehicle's surrounding circumstances and provide the baseline information that is used in conjunction with the driver's eye gaze vector to determine whether or not to issue alerts or activate car control functions. A vehicle including the accident prevention system and the eye gaze detection system is referred to below as an "enhanced vehicle."

The accident prevention system can issue different kinds of alerts, and activate different car control functions depending upon the types of dangerous driving circumstances the accident prevention system is configured to respond to. Examples of dangerous vehicle circumstances will be described below to illustrate various embodiments and features of the accident prevention system. Each type of vehicle circumstance (or vehicle accident risk) may make use of different kinds of proximity sensors to provide the accident prevention system data which it uses as the baseline for determining what kind of response to provide. Examples of dangerous vehicle circumstances include front crash accidents, lane change accidents and lane keeping accidents. These examples are merely illustrative, however, and the predictive HMI described herein can be configured to respond to other dangerous circumstances as well without deviating from the principles described herein.

Crash Mitigation Braking System

In one embodiment, the accident prevention system comprises a crash mitigation braking system (CMBS). Current CMBSs sound an alert and in some instances brake the vehicle depending upon the distance between the driver's vehicle and a vehicle in front of the driver's vehicle as well as the speed difference between the two vehicles. In the exemplary embodiments, the CMBS uses eye gaze vector information in order to minimize alerts when the driver is paying attention to the road in order to prevent unnecessary alerts from being issued.

FIG. 4 illustrates a system configuration of a crash mitigation braking system (CMBS) in accordance with one embodiment. The CMBS includes a radar device 420 and an electronic pretensioner (not shown). In one embodiment, the radar device 420 is a millimeter-wave radar. In the embodiment illustrated in FIG. 4, the radar device 420 is positioned in front of the vehicle, though the radar may also be placed elsewhere on the vehicle. The enhanced vehicle additionally includes a CMBS computing device (or "ACC/CMBS ECU") 410 that includes a processor and storage and/or memory capable of storing computer program instructions that when executed by a processor perform various functions described herein. The ACC/CMBS ECU 410 may be incorporated into an electronic control unit (ECU) of the vehicle. The radar device 420 is electrically connected to the ACC/CMBS ECU 410 and communicates external vehicle position and velocity information to the ACC/CMBS ECU.

FIG. 5 illustrates an example of the operation of a collision mitigation braking system in accordance with one embodiment. As shown in FIG. 5, in one embodiment, the radar 420 detects vehicles ahead of the enhanced vehicle and provides the information to the ACC/CMBS ECU 410. The ACC/CMBS ECU, as part of the CMBS and accident prevention systems, provides an audio and/or visual warning to the driver if a risk of a collision is detected. If the two vehicles continue to converge the CMBS can apply light braking to the enhanced vehicle and increases the seatbelt tension slightly using the electronic pretensioner to provide a tactile warning to the driver. If the vehicles get even closer together, e.g., to the point where a collision is unavoidable or nearly unavoidable if no action were to be taken by the driver, then the CMBS can activate strong braking to the enhanced vehicle and securely tighten the seatbelt using the electronic pretensioner in order to mitigate injury caused by impact.

Figure 6:
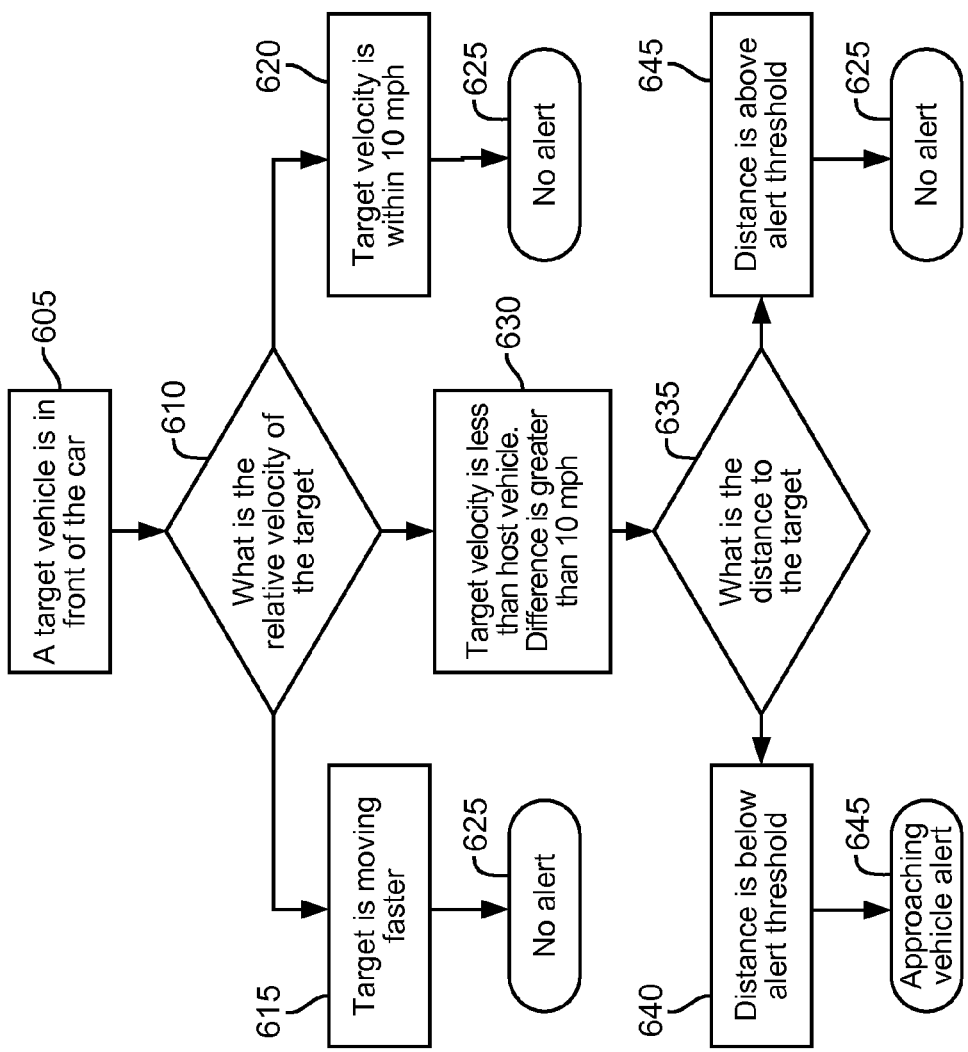
FIG. 6 is a flowchart of existing crash mitigation braking systems where eye gaze technology is not used.

FIG. 6 is a flowchart of existing crash mitigation braking systems where eye gaze technology is not used. Existing systems detect whether a target vehicle is in front of the driver's vehicle 605 and determine the relative velocity of the target vehicle 610 relative to the driver's vehicle. If the target vehicle is moving faster 615, then no alert is given 625. If the target vehicle is moving slower, but within ten miles per hour (mph) (for example) of the driver's vehicle 620 then no alert is given 625. If the target vehicle is moving more than ten mph slower than the driver's vehicle 630 then existing systems determine the distance to the target vehicle 635 and generate an alert 645 if the distance is below an alert threshold 640. Otherwise 645, no alert provided 625. The alert threshold may vary depending upon the speed of the driver's vehicle or the difference in speed between the two vehicles.

Any alert provided by a system such as the one described in FIG. 6 is independent of the driver's knowledge of the circumstances. Here, the circumstances are the relative positions and velocities of the driver's car and a target vehicle in front of the driver's car. Even if the driver is well aware of the target vehicle, the warning will be provided regardless. This may be annoying to the driver, for example, if the driver is accelerating in order to safely change lanes. In this example, the driver may be aware that he is getting closer (possibly dangerous close) to the target vehicle, but with the intent of changing lanes more safely. In this example, unnecessary warnings may hinder the driver's ability to safely perform the lane change. Based on experiences such as this, the driver would be included to ignore the warning messages, or to disable the warning system entirely, thereby negating their effectiveness.

Figure 7:
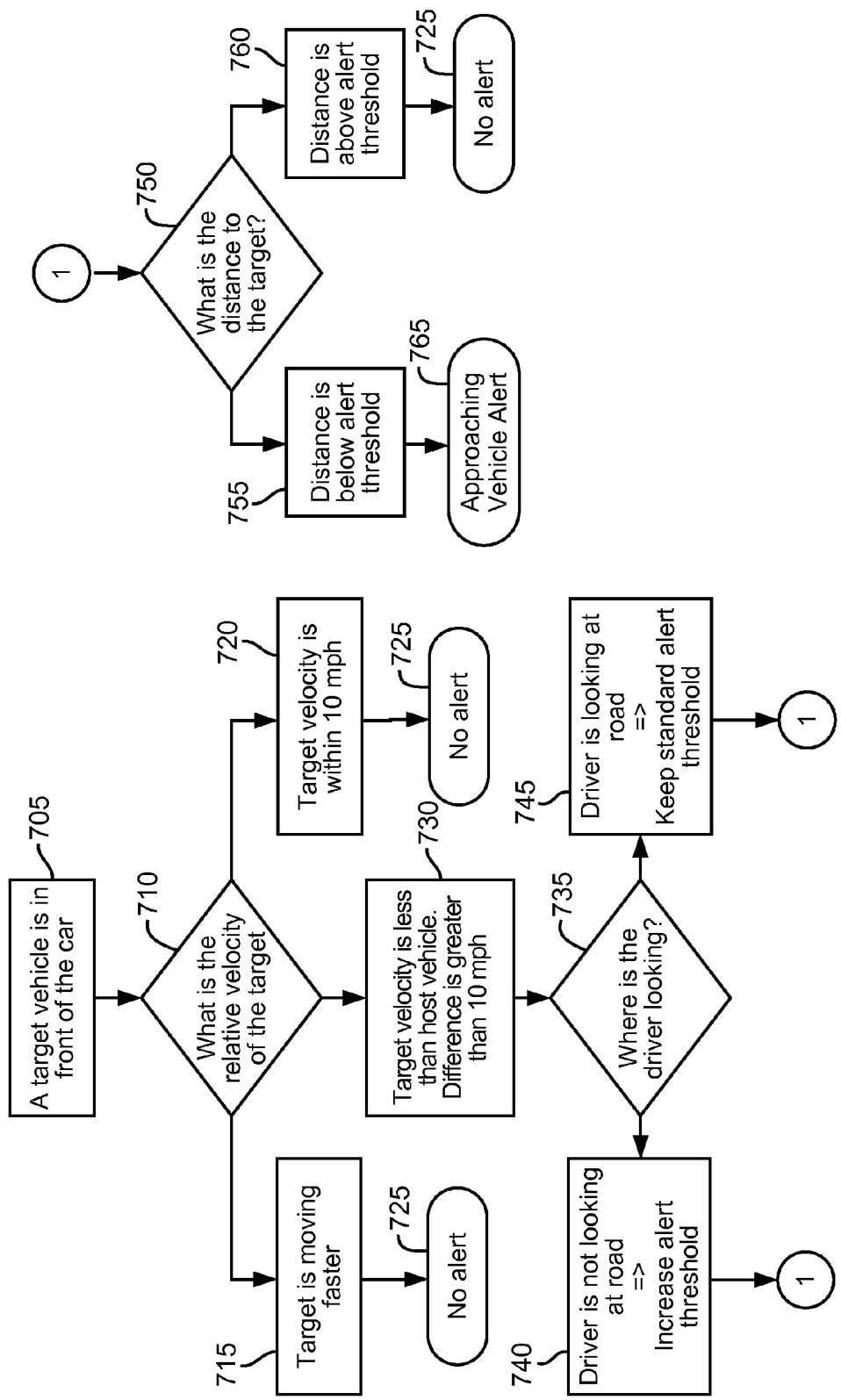
FIG. 7 is a flowchart of a crash mitigation braking system operating in conjunction with an eye gaze detection system in accordance with one embodiment.

FIG. 7 is a flowchart of a crash mitigation braking system operating in conjunction with an eye gaze detection system in accordance with one embodiment. The CMBS in the enhanced vehicle detects whether a target vehicle is in front of the enhanced vehicle 705 and determines the relative velocity of the target vehicle 710 relative to the enhanced vehicle. If the target vehicle is moving faster 715 then no alert 725 is given. If the target vehicle is moving slower 720, but with ten miles per hour (mph) (for example) of the enhanced vehicle then no alert is given 725. If the target vehicle is moving more than ten mph slower than the enhanced vehicle 730 then the CMBS communicates with the eye gaze detection system to obtain a determination as to where the driver is looking 735. If the driver is not looking forward at the road 740 then the CMBS increases the alert threshold distance value (so that an alert will occur when a target vehicle is farther away). On the other hand, if the driver is looking at the road 745 then the CMBS maintains unaltered or decreases the alert threshold distance value. Then the CMBS ECU system determines the distance to the target vehicle 750 and generates an alert 765 if the distance is below the alert threshold 755. Otherwise 760, no alert is provided 725.

By incorporating the eye gaze detection system into the CMBS of the accident prevention system, alerts may be tailored to the driver's knowledge of the driving circumstances. Again consider the example above of a driver accelerating to change lanes. In this case, if the driver is checking how close he is to the vehicle in front of him while accelerating to change lanes, no alert is provided. By limiting the threshold at which an alert is given based on the driver's awareness, less alerts in total are provided, increasing the efficacy of each alert and encouraging the driver to think of the accident prevention system as a valuable tool rather than an annoyance.

Lane Keeping Assist System

In one embodiment, the accident prevention system comprises a lane keeping assist system (LKAS). The LKAS sounds an audible and/or visual warning when a camera image indicates that the driver's vehicle is departing from its current traffic lane. In the exemplary embodiments, the LKAS uses eye gaze vector information in order to eliminate warnings when the driver is paying attention to the road.

FIG. 8 illustrates a vehicle layout and circuit for a predictive HMI using a lane keeping assist system (LKAS) in accordance with one embodiment. The LKAS comprises an LKAS ECU 810 comprising a processor and storage and/or memory capable of storing computer program instructions that when executed by a processor perform various functions described herein. The LKAS additionally comprises a camera 820 that, in one embodiment, is positioned in the center of the enhanced vehicle near the windshield. It is envisioned that other camera positions and even multiple cameras can be used. The LKAS is connected to the vehicle communication (CAN) bus 130 and can be part of the vehicle's ECU. In this case, the LKAS ECU 810 is part of the vehicle's ECU.

FIG. 9 is a flowchart of existing lane keeping assist systems where eye gaze technology is not used. In one example embodiment, the LKAS operates in situations where the driver's vehicle is operating on a straight road or on a road with a curve having a radius of 230 meters or more with the vehicle speed between 60 and 100 kilometers per hour (km). Other embodiments can operate with different operating conditions. The camera detects the lane markers 910 and determines based upon the geography of the camera relative to the lane markers whether the vehicle is within the lane markers 920. If the vehicle is outside the lane markers 940 an alert is given 960. Otherwise 930, no alert is given 950.

Alerts provided by existing systems such as the one described in FIG. 9 are independent of the driver's knowledge of the circumstances. Here, the circumstances include the position and orientation of the vehicle relative to the geography of the camera and the layout of lane markings Even if the driver is purposefully changing lanes slowly, the warning will be provided regardless. In this example, unnecessary warnings may annoy the driver, causing them to ignore the warnings provided by the LKAS, or to disable the system entirely.

Figure 10:
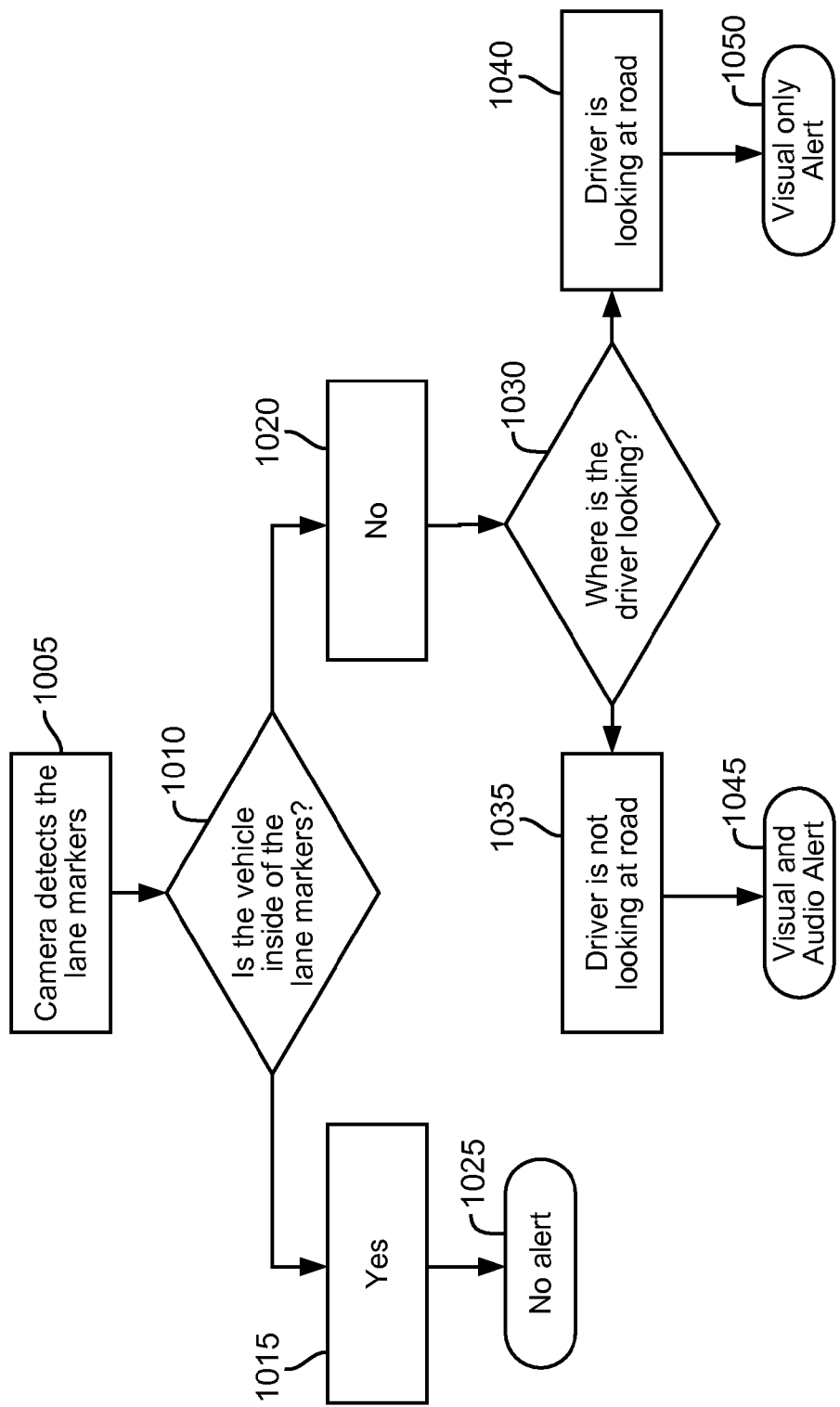
FIG. 10 is a flowchart of a lane keeping assist system operating in conjunction with an eye gaze detection system in accordance with one embodiment.

FIG. 10 is a flowchart of a lane keeping assist system operating in conjunction with an eye gaze detection system in accordance with one embodiment. In an enhanced vehicle, the camera 820 detects the lane markers 1005 and determines, based upon the geography of the camera relative to the lane markers, whether the vehicle is within the lane markers 1010. If the vehicle is outside the lane markers the system 1020 uses the eye gaze detector to determine if the driver is paying attention to the road 1030. If the driver is looking forward at the road 1040 then a lower intensity alert is given 1050. If the driver is not looking forward at the road 1035 then a higher intensity alert 1045 is given. If the vehicle is inside of the lane markers 1015, then no alert is provided 1025.

The intensity of the alert given is relative, and a wide variety of lower and higher intensity alerts can be provided. For example, the low intensity alert may be a visual alert only, whereas the high intensity alert comprises a visual alert and an audio alert. In another example, the low intensity alert may be no alert at all, and the high intensity alert comprises a visual and/or audio alert. In other examples, the alerts differ based on the volume or location of the audio alert, or based on the visual pattern, brightness, or location of the visual alert. The location of the alert may be used to draw the driver's attention to a particular gaze location, for example to draw their attention to the left or right side of the vehicle.

By incorporating the eye gaze detection system into the LKAS of the accident prevention system, alerts may be tailored to the driver's knowledge of the driving circumstances. Again consider the example above of a driver changing lanes very slowly. In this case, if the driver is looking at the road, either no alert or a low intensity alert is provided. By limiting the number of alerts provided and/or the alert intensity, each alert becomes more effective, encouraging the driver to think of the accident prevention system as a valuable tool rather than an annoyance.

Lane Change and Blind Spot Indication System

In one embodiment, the accident prevention system comprises blind spot indication (BSI) system. The BSI system provides a visual or audio warning when the enhanced vehicle is about to enter a lane that is already occupied by another vehicle. In the exemplary embodiments, the BSI system uses eye gaze vector information in order to limit the circumstances in which an alert is provided to the driver.

Figure 11:
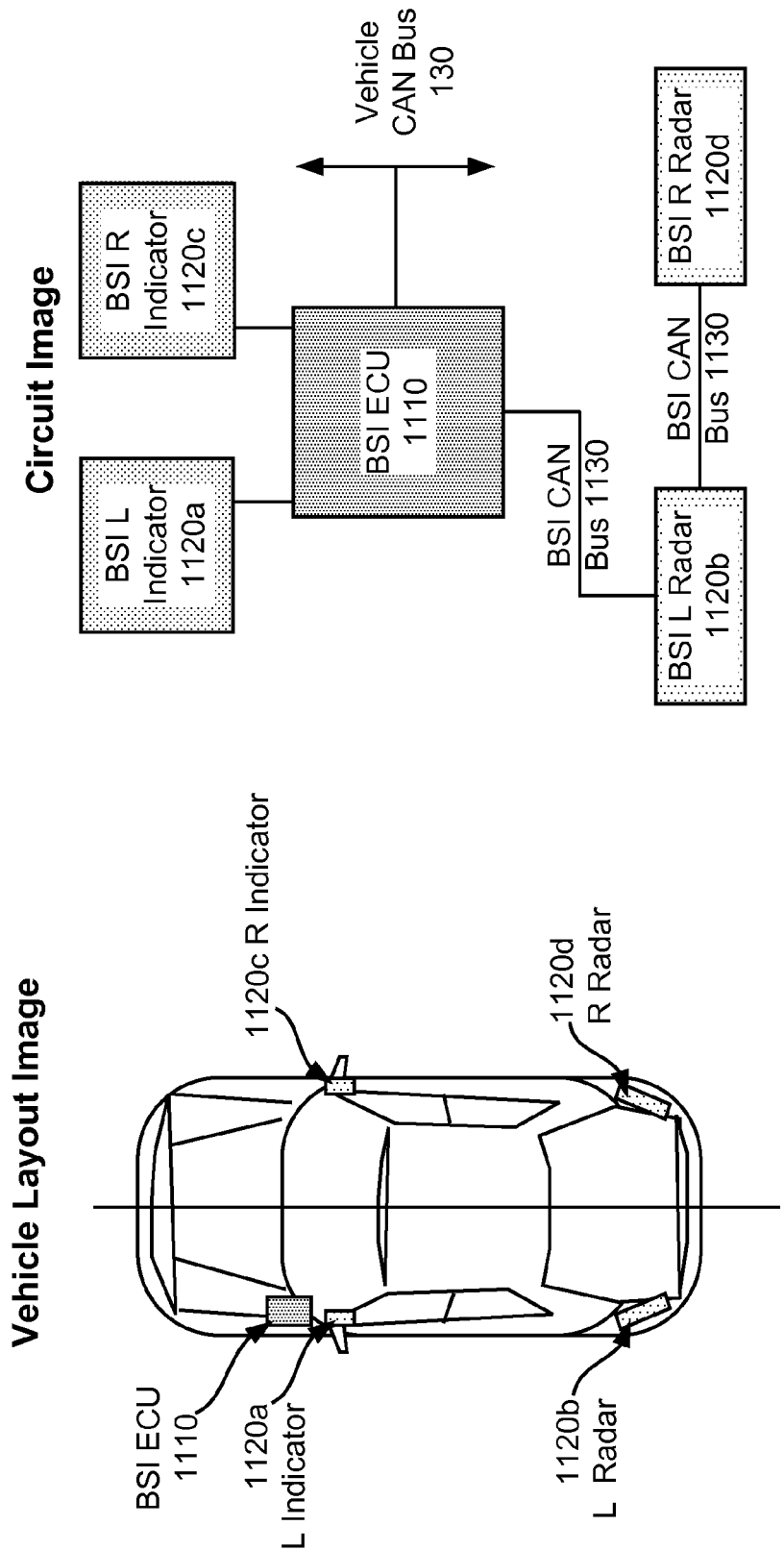
FIG. 11 illustrates a vehicle layout and circuit for a predictive HMI using a blind spot indication (BSI) system in accordance with one embodiment.

FIG. 11 illustrates a vehicle layout and circuit for a predictive HMI using a blind spot indication (BSI) system in accordance with one embodiment. In one embodiment, the enhanced vehicle includes two radar devices directed toward the left 1120*b* and right 1120*d* rear of the vehicle and two radar devices directed toward a position just behind the driver's vehicle on the left 1120a and right 1120c side. The radars 1120 are connected to a blind spot indication (BSI) ECU 1110. The BSI ECU 1110 can be part of the vehicle's ECU, which is connected to other vehicle sensors and devices via a data bus (vehicle CAN Bus) 130. The BSI ECU can include a processor having storage and/or memory capable of storing computer program instructions that when executed by a processor perform various functions described herein.

Figure 12:
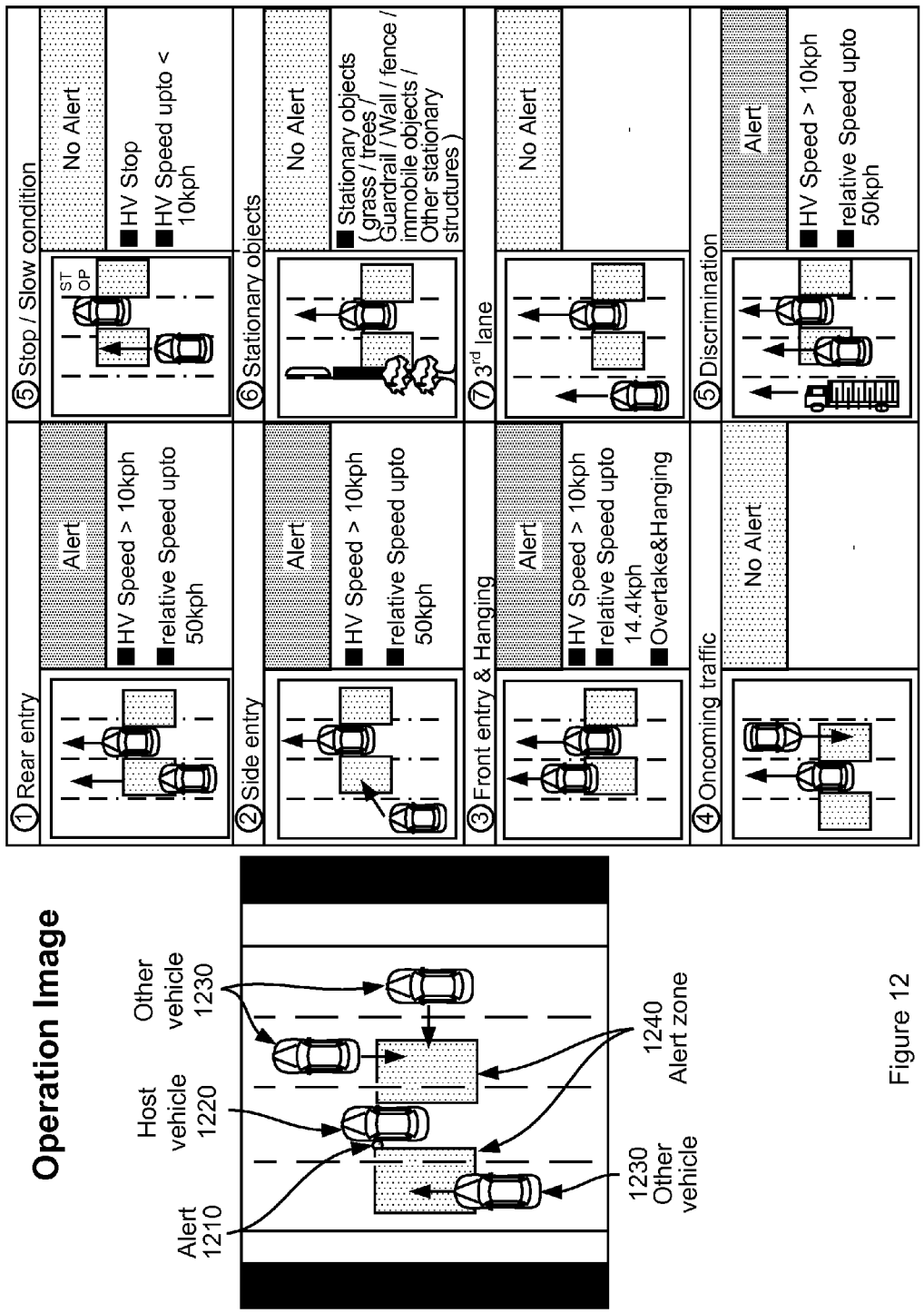
FIG. 12 illustrates an example of the operation of existing blind spot indication systems in accordance with one embodiment.

FIG. 12 illustrates an example of the operation of existing blind spot indication systems in accordance with one embodiment. FIG. 12 displays two alert zones 1240 located in the driver's blind spot (the driver's vehicle is referred to as the host vehicle 1220). FIG. 12 also illustrates situations in which an alert 1210 is triggered and is not triggered by existing BSI systems. These situations are described in greater detail in FIGS. 13 and 14. For example, alerts 1210 may be triggered by other vehicles 1230 or stationary objects entering the alert zones 1240.

Figure 13:
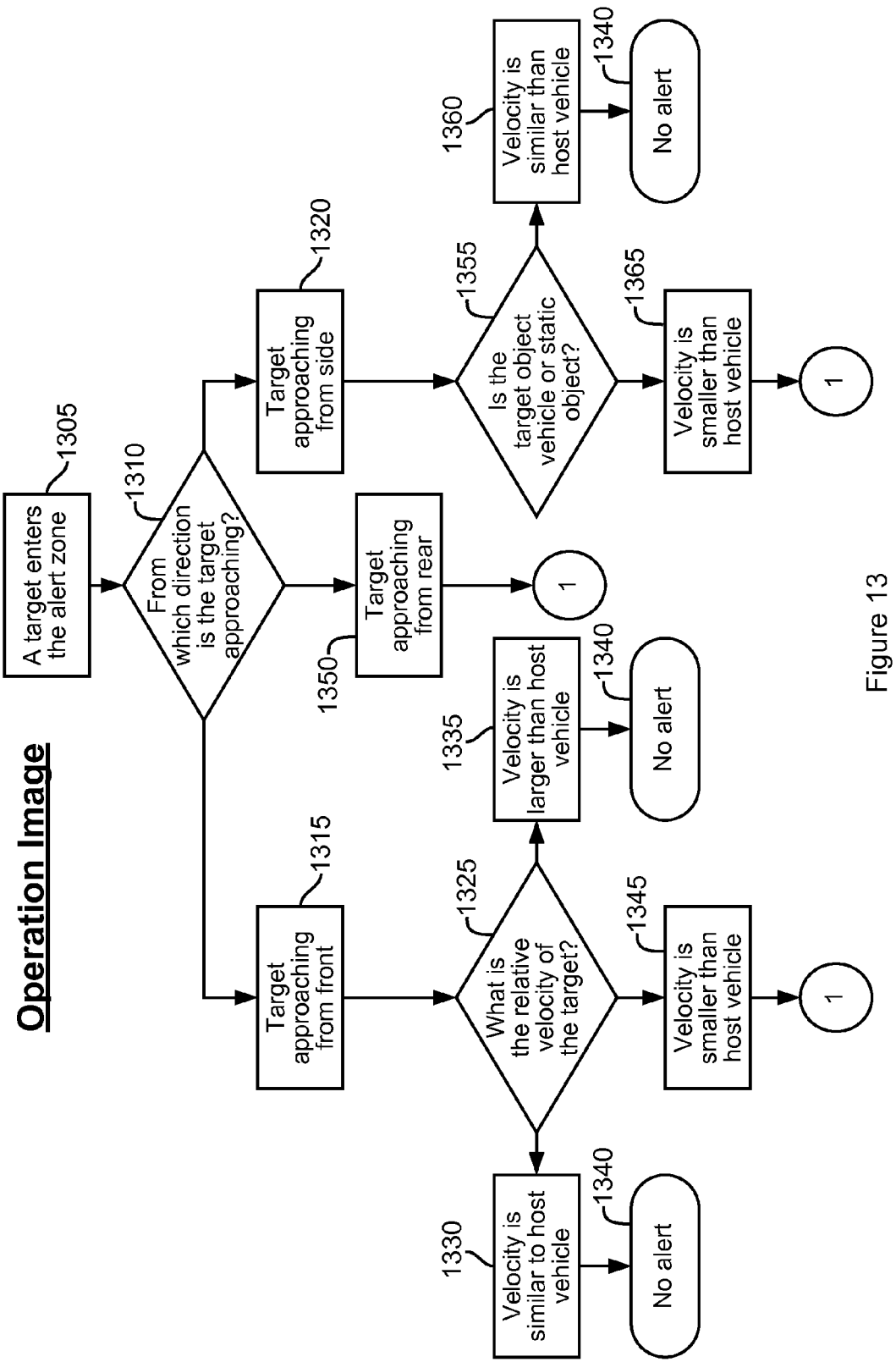
FIGS. 13-14 are flowcharts of existing blind spot indication systems.
Figure 14:
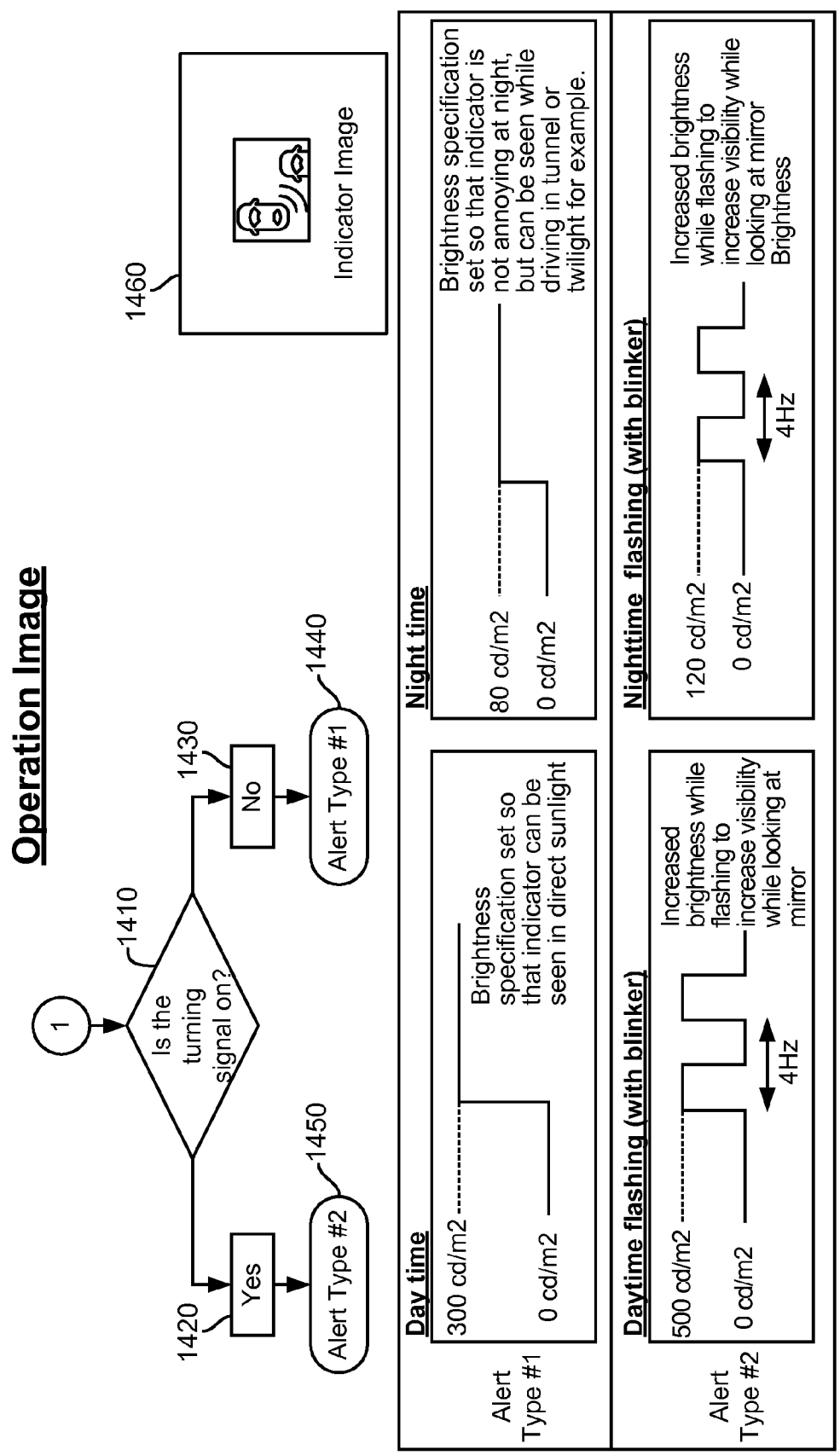

FIGS. 13-14 are flowcharts of existing blind spot indication systems. In one such example BSI system, if another "target" vehicle enters an alert zone 1305 the BSI ECU determines the direction from which the target is approaching 1310. If the target vehicle is approaching from the front 1315 then the BSI system determines the relative velocity of the target vehicle 1325. If the velocity is similar to 1330 or greater than 1335 the driver's vehicle, then no alert is generated 1340. If the relative velocity is less than the driver's vehicle 1345, then the BSI system determines whether the driver has activated the turn signal of their vehicle in the direction of the target vehicle 1410. If so 1420, an alert of alert type 2 is generated 1450, as displayed in FIG. 14. If the turn signal is not on in the direction of the target vehicle 1430 then an alert of alert type 1 can be generated 1440, again as displayed in FIG. 14.

With reference FIGS. 13 and 14, if a target vehicle is approaching an alert zone from the rear 1350 then the BSI determines whether the turn signal of the driver's vehicle is on in the direction of the target vehicle 1410. If so 1420, an alert of alert type 2 is generated 1450. If the turn signal is not on in the direction of the target vehicle 1430 then an alert of alert type 2 can be generated 1440.

With reference to FIGS. 13 and 14, if a target vehicle enters an alert zone from the side of the alert zone 1320 then the BSI system determines whether the target object is a vehicle or a stationary object 1335. If it is a stationary object then no alert is given (not shown). If it is a target vehicle then the BSI ECU determines the relative velocity of the target vehicle with respect to the driver's vehicle and if the velocities are similar 1360 then no alert is generated 1340, although in alternate embodiments if the velocity is similar the process continues at step 1 in FIG. 14 and may result in an alert being generated in order to warn the driver that a vehicle has entered the driver's blind spot. If the velocity of the target vehicle is lower than the velocity of the driver's vehicle 1365 then the BSI ECU determines whether the turn signal of the driver's vehicle is on in the direction of the target vehicle 1410. If so 1420, an alert of alert type 2 is generated 1450. If the turn signal is not on in the direction of the target vehicle 1430 then an alert of alert type 1 can be generated 1440. In an alternative embodiment, if the velocity of the target vehicle is less than the velocity of the driver's vehicle then no alert is generated. In one example embodiment, the alert is an indicator image 1460, which varies in intensity based on the alert type, either type 1 or type 2, as well as based on the ambient light conditions (e.g., night time or day time).

Any alert provided by a system such as the one described in FIGS. 12-14 is independent of the driver's knowledge of the circumstances. Here, the circumstances include the presence of vehicles or objects in the driver's blind spot. Unnecessary warnings may annoy the driver, causing them to ignore the warnings provided by the BSI system, or to disable the system entirely.

Figure 15:
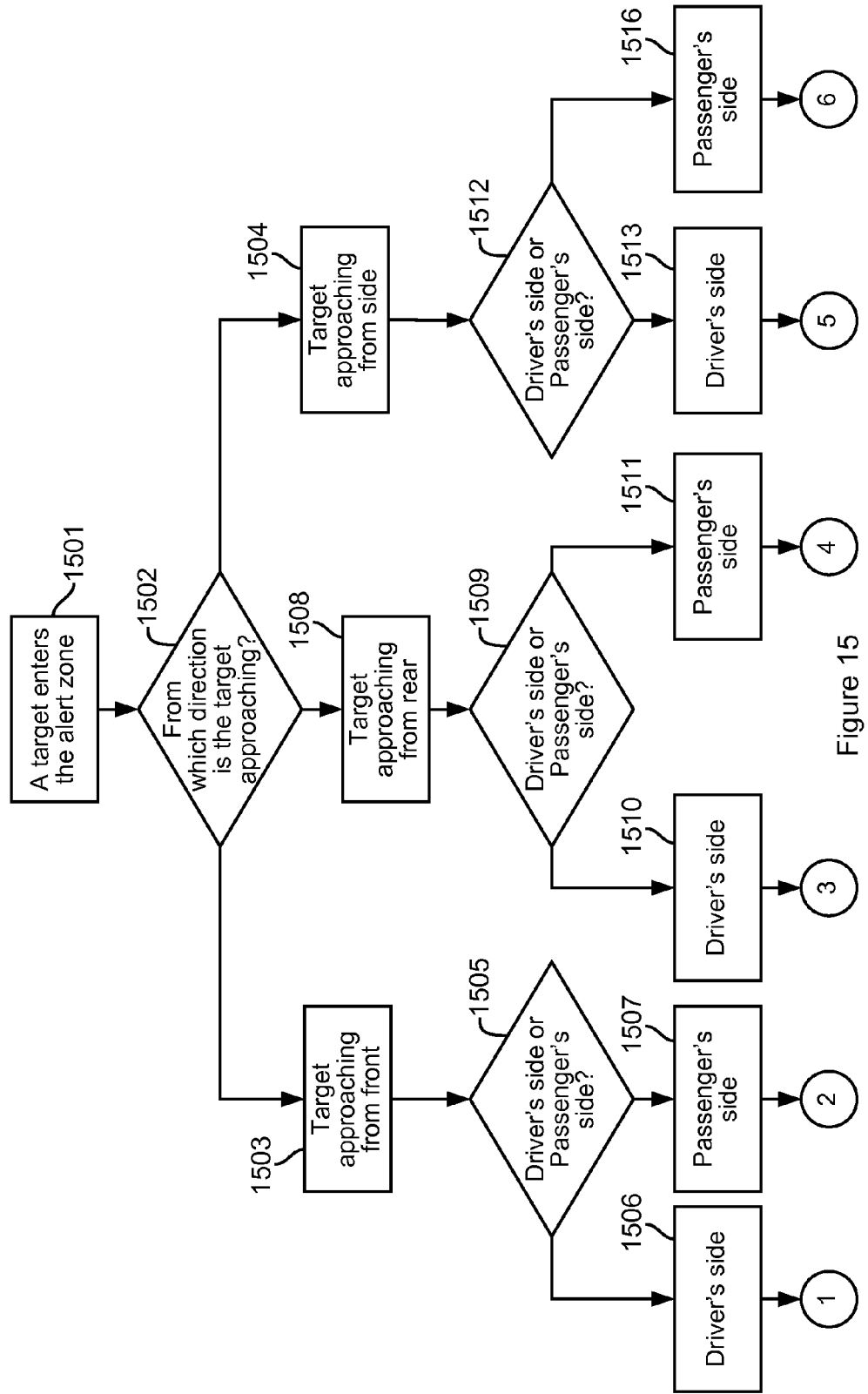
FIGS. 15-20 are flowcharts of a blind spot indication system operating in conjunction with an eye gaze detection system in accordance with one embodiment.

FIGS. 15-20 are flowcharts of a blind spot indication system operating in conjunction with an eye gaze detection system in accordance with one embodiment. In this embodiment, the BSI system incorporates eye gaze vector information into its determination about whether to provide an alert when a vehicle or object enters the driver's blind spot. With reference to FIG. 15, if a target vehicle enters an alert zone 1501, the BSI ECU determines the direction from which the target vehicle is approaching 1502. If the target vehicle is approaching the alert zone from the front 1503 then the BSI ECU determines whether the alert zone is on the driver side or passenger side 1505.

Figure 16:
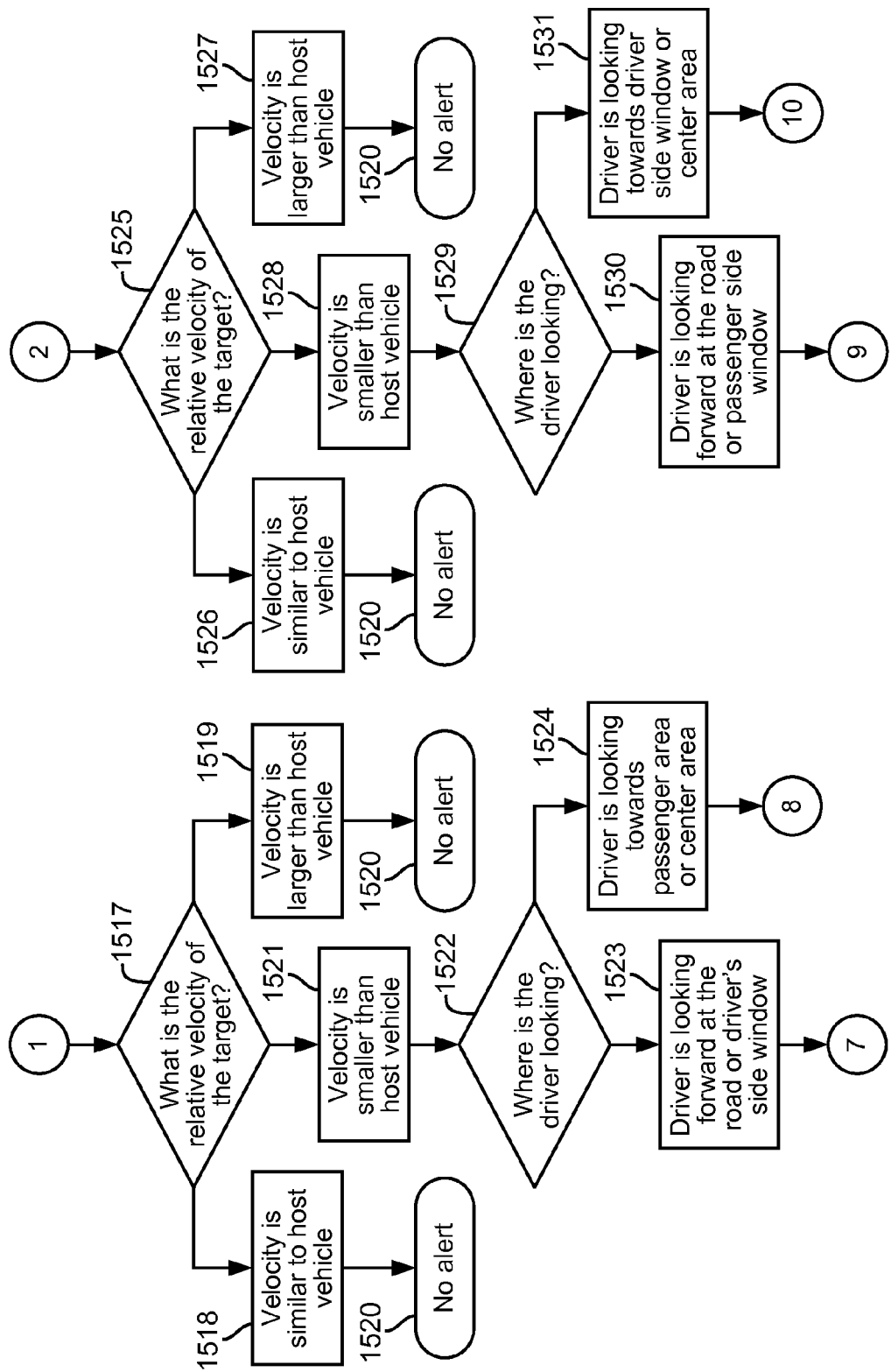

If the target vehicle approaches the alert zone from the front and from the driver's side 1506 the BSI ECU determines the relative velocity of the target vehicle in comparison with the enhanced vehicle 1517 (FIG. 16). If the velocity of the target vehicle is similar to 1518 or faster than 1519 the host vehicle then no alert is given 1520. If the velocity of the target vehicle is less than the enhanced vehicle 1521 then the BSI ECU, using the eye gaze vector, determines where the driver is looking 1522. If the driver is looking forward at the road or toward the driver's side window 1523 then (with reference to #7 in FIG. 19) the BSI ECU generates an alert 1552, e.g., alert type 1, if the BSI ECU determines that the steering sensor is detecting a left turn 1550. If the BSI ECU determines that the steering sensor is not detecting a left turn, then the BSI ECU generates an alert 1553, e.g., alert type 2 if the BSI ECU determines 1551 that the left turning signal is not on and generates an alert 1554, e.g., alert type 3, if the BSI ECU determines 1551 that the left turning signal is on. With reference to FIG. 16, if the driver is looking toward the passenger area or the center area 1524 then (with reference to #8 in FIG. 19) the BSI ECU generates an alert 1552, e.g., alert type 1, if the BSI ECU determines that the steering sensor is detecting a left turn 1555. If the BSI ECU determines that the steering sensor is not detecting a left turn, then the BSI ECU generates an alert 1553, e.g., alert type 2 if the BSI ECU determines 1556 that the left turning signal is not on and generates an alert 1557, e.g., alert type 4, if the BSI ECU determines 1556 that the left turning signal is on.

If the target vehicle approaches the alert area from the front and from the passenger's side 1507 the BSI ECU determines the relative velocity of the target vehicle in comparison with the enhanced vehicle 1525 (FIG. 16). If the velocity of the target vehicle is similar to 1526 or faster than 1527 the host vehicle then no alert is given 1520. If the velocity of the target vehicle is less than the enhanced vehicle 1528 then the BSI ECU, using the eye gaze technology, determines where the driver is looking 1529. If the driver is looking forward at the road or toward the passenger's side window 1530 then (with reference to #9 in FIG. 20) the BSI ECU generates an alert 1560, e.g., alert type 5, if the BSI ECU determines 1558 that the steering sensor is detecting a right turn. If the BSI ECU determines that the steering sensor is not detecting a right turn, then the BSI ECU generates an alert 1553, e.g., alert type 2 if the BSI ECU determines 1559 that the right turning signal is not on and generates an alert 1554, e.g., alert type 3, if the BSI ECU determines 1559 that the right turning signal is on. With reference to FIG. 16, if the driver is looking toward the driver side window or center area 1531 then (with reference to #10 in FIG. 20) the BSI ECU generates an alert 1561, e.g., alert type 5, if the BSI ECU determines 1561 that the steering sensor is detecting a right turn. If the BSI ECU determines that the steering sensor is not detecting a right turn, then the BSI ECU generates an alert 1553, e.g., alert type 2 if the BSI ECU determines 1562 that the right turning signal is not on and generates an alert 1563, e.g., alert type 6, if the BSI ECU determines 1562 that the right turning signal is on.

Figure 17:
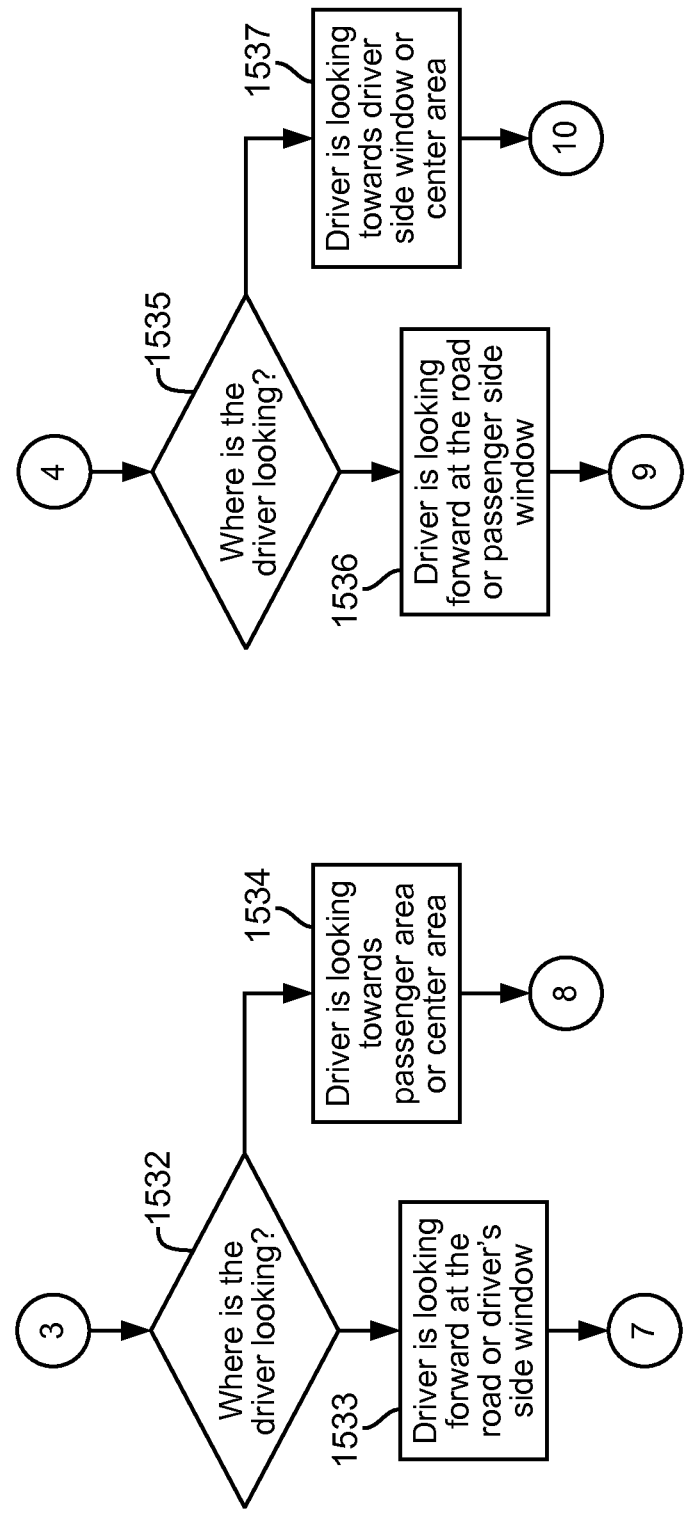

If the target vehicle approaches the alert area from the rear 1508 and from the driver's side 1510 then the BSI ECU, using the eye gaze technology, determines (with reference to #3 in FIG. 17) where the driver is looking 1532. If the driver is looking forward at the road or toward the driver's side window 1533 then (with reference to #7 in FIG. 19) the BSI ECU generates an alert 1552, e.g., alert type 1, if the BSI ECU determines 1550 that the steering sensor is detecting a left turn. If the BSI ECU determines that the steering sensor is not detecting a left turn, then the BSI ECU generates an alert 1553, e.g., alert type 2 if the BSI ECU determines 1551 that the left turning signal is not on and generates an alert 1554, e.g., alert type 3, if the BSI ECU determines 1551 that the left turning signal is on. With reference to FIG. 17, if the driver is looking toward the passenger area or the center area 1534 then (with reference to #8 in FIG. 19) the BSI ECU generates an alert 1552, e.g., alert type 1, if the BSI ECU determines 1555 that the steering sensor is detecting a left turn. If the BSI ECU determines that the steering sensor is not detecting a left turn, then the BSI ECU generates an alert 1553, e.g., alert type 2 if the BSI ECU determines 1556 that the left turning signal is not on and generates an alert 1557, e.g., alert type 4, if the BSI ECU determines 1556 that the left turning signal is on.

If the target vehicle approaches the alert area from the rear and from the passenger's side 15111 then the BSI ECU, using the eye gaze technology, determines (with reference to #4 in FIG. 17) where the driver is looking 1535. If the driver is looking forward at the road or toward the passenger's side window 1536 then (with reference to #9 in FIG. 20) the BSI ECU generates an alert 1560, e.g., alert type 5, if the BSI ECU determines 1558 that the steering sensor is detecting a right turn. If the BSI ECU determines that the steering sensor is not detecting a right turn, then the BSI ECU generates an alert 1553, e.g., alert type 2 if the BSI ECU determines 1559 that the right turning signal is not on and generates an alert 1554, e.g., alert type 3, if the BSI ECU determines 1559 that the right turning signal is on. With reference to FIG. 17, if the driver is looking toward the driver side window or center area 1537 then (with reference to #10 in FIG. 20) the BSI ECU generates an alert 1560, e.g., alert type 5, if the BSI ECU determines 1561 that the steering sensor is detecting a right turn. If the BSI ECU determines that the steering sensor is not detecting a right turn, then the BSI ECU generates an alert 1553, e.g., alert type 2 if the BSI ECU determines 1562 that the right turning signal is not on and generates an alert 1563, e.g., alert type 6, if the BSI ECU determines that the right turning signal is on.

Figure 18:
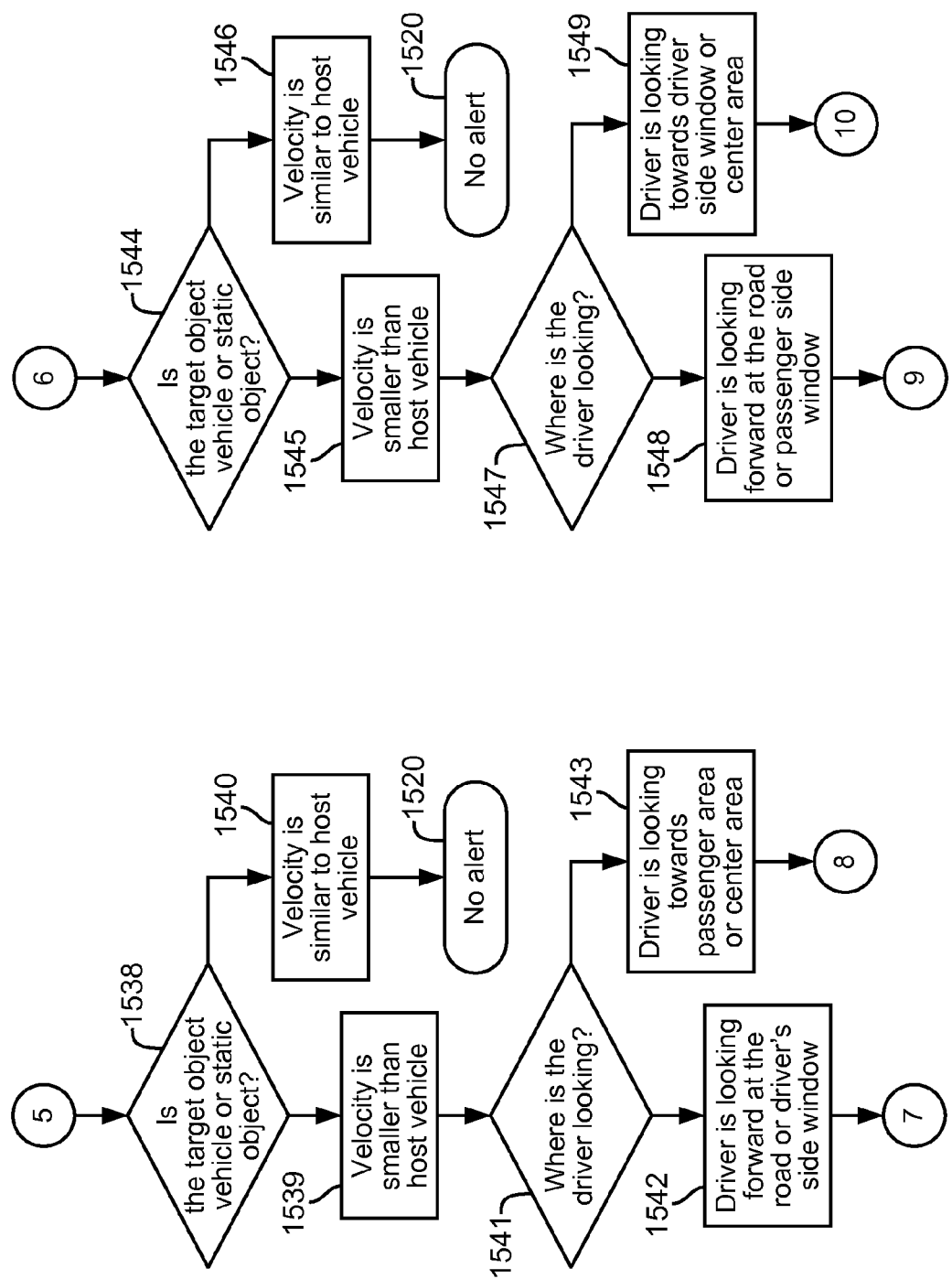
Figure 19:
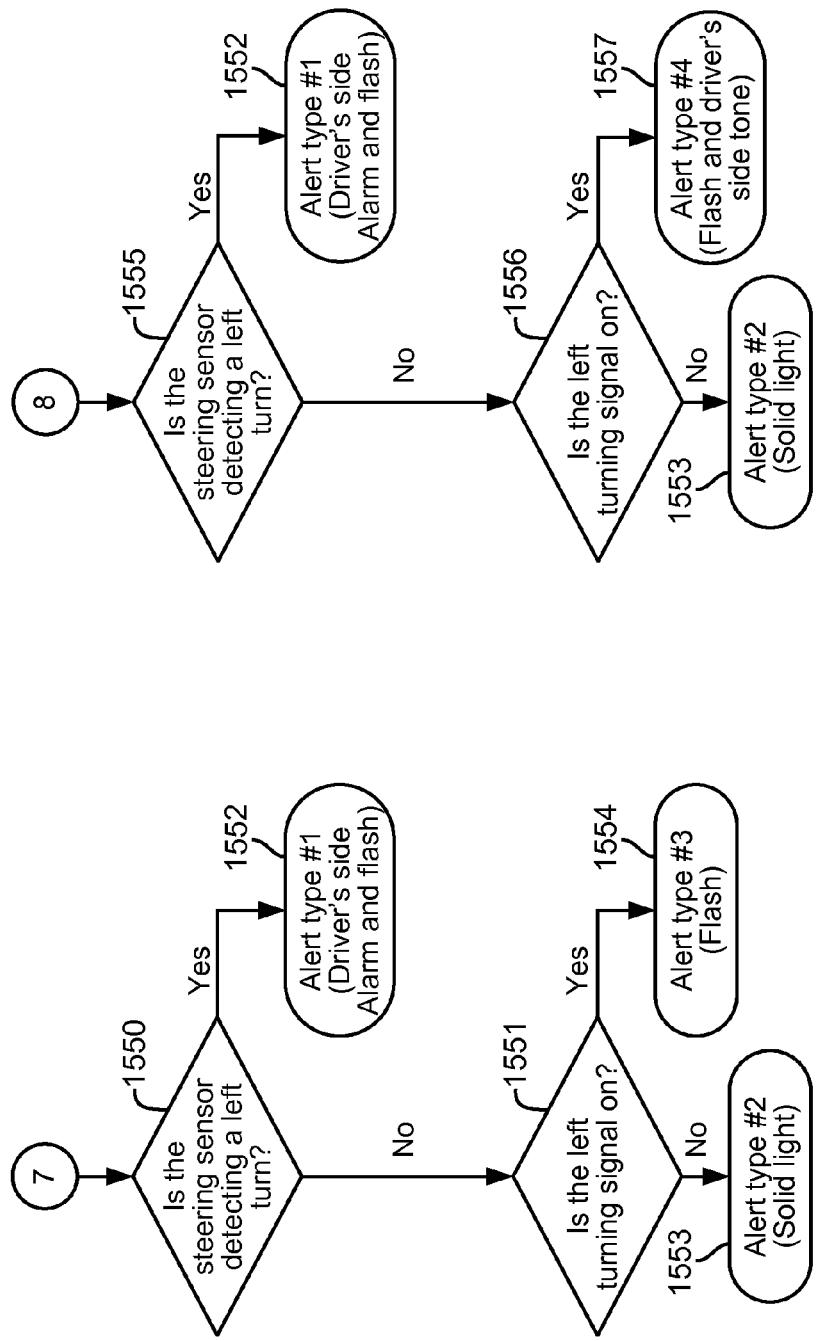
Figure 20:
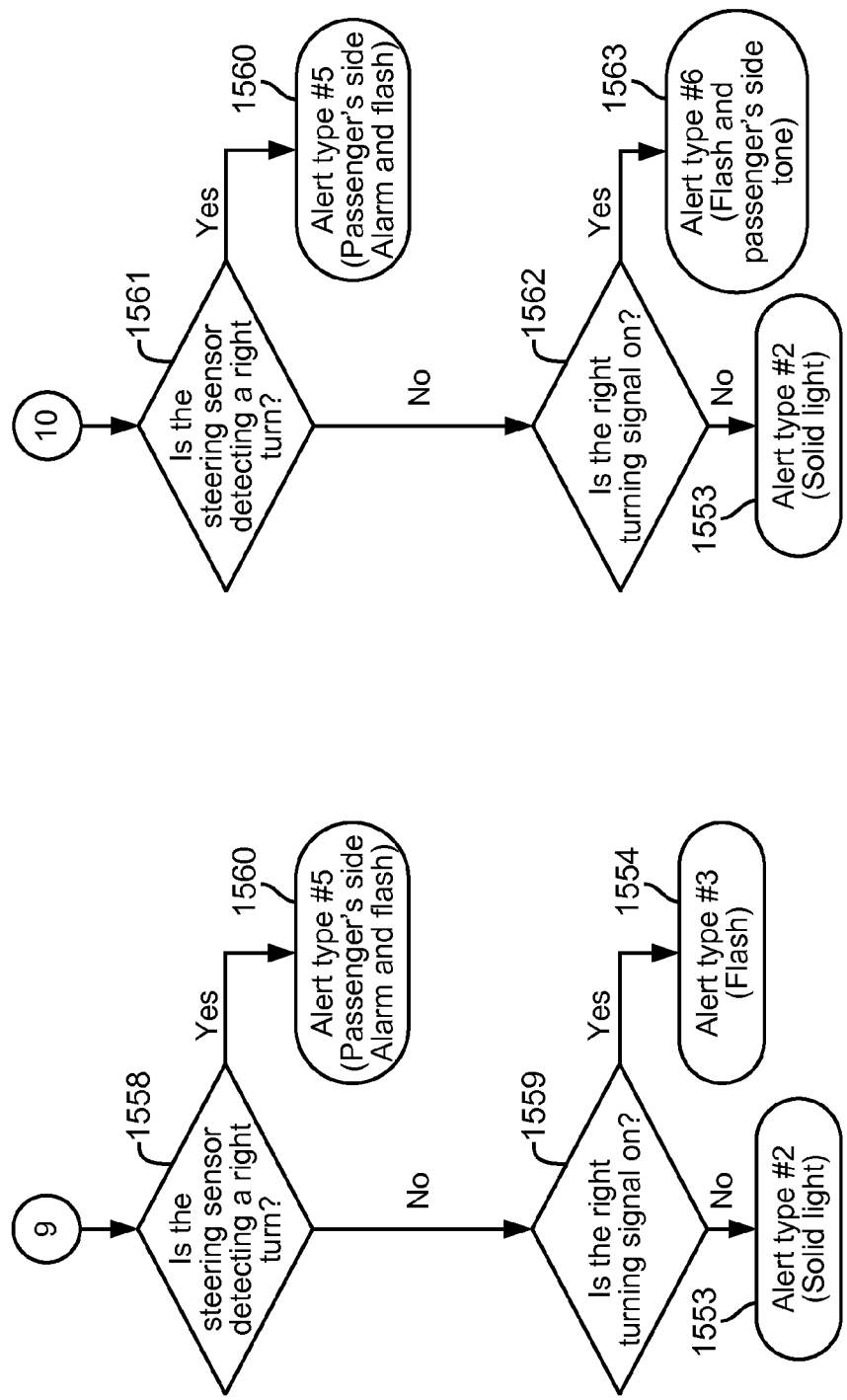

If the target vehicle approaches the alert area from the side 1504 and from the driver's side 1513 the BSI ECU determines 1538 (with reference to #5 in FIG. 18) whether the target vehicle is in fact a vehicle or a stationary object. If it is a vehicle then the BSI ECU determines the relative velocity of the target vehicle in comparison with the enhanced vehicle. If the velocity of the target vehicle is similar to or faster than the host vehicle 1540 then no alert is given 1520, although in alternate embodiment alerts can be given in this and similar situations herein subject to the remaining tests, e.g., where the driver is looking. If the velocity of the target vehicle is less than the enhanced vehicle 1539 then the BSI ECU, using the eye gaze technology, determines where the driver is looking 1541. If the driver is looking forward at the road or toward the driver's side window 1542 then (with reference to #7 in FIG. 19) the BSI ECU generates an alert 1552, e.g., alert type 1, if the BSI ECU determines 1550 that the steering sensor is detecting a left turn. If the BSI ECU determines that the steering sensor is not detecting a left turn, then the BSI ECU generates an alert 1553, e.g., alert type 2 if the BSI ECU determines 1551 that the left turning signal is not on and generates an alert 1554, e.g., alert type 3, if the BSI ECU determines 1551 that the left turning signal is on. With reference to FIG. 18, if the driver is looking toward the passenger area or the center area 1543 then (with reference to #8 in FIG. 19) the BSI ECU generates an alert 1552, e.g., alert type 1, if the BSI ECU determines 1555 that the steering sensor is detecting a left turn. If the BSI ECU determines that the steering sensor is not detecting a left turn, then the BSI ECU generates an alert 1553, e.g., alert type 2 if the BSI ECU determines 1556 that the left turning signal is not on and generates an alert 1557, e.g., alert type 4, if the BSI ECU determines 1556 that the left turning signal is on.

If the target vehicle approaches the alert area from the side 1504 and from the passenger's side 1516 the BSI ECU determines (with reference to #6 in FIG. 18) whether the target vehicle is in fact a vehicle or a stationary object 1544. If it is a vehicle then the BSI ECU determines the relative velocity of the target vehicle in comparison with the enhanced vehicle. If the velocity of the target vehicle is similar to or faster than the host vehicle 1546 then no alert 1520 is given although in alternate embodiment alerts can be given in this and similar situations herein subject to the remaining tests, e.g., where the driver is looking. If the velocity of the target vehicle is less than the enhanced vehicle 1545 then the BSI ECU, using the eye gaze technology, determines where the driver is looking 1547. If the driver is looking forward at the road or toward the passenger's side window 1548 then (with reference to #9 in FIG. 20) the BSI ECU generates an alert 1560, e.g., alert type 5, if the BSI ECU determines 1558 that the steering sensor is detecting a right turn. If the BSI ECU determines that the steering sensor is not detecting a right turn, then the BSI ECU generates an alert 1553, e.g., alert type 2 if the BSI ECU determines 1559 that the right turning signal is not on and generates an alert 1554, e.g., alert type 3, if the BSI ECU determines 1559 that the right turning signal is on. With reference to FIG. 18, if the driver is looking toward the driver side window or center area 1549 then (with reference to #10 in FIG. 19) the BSI ECU generates an alert 1560, e.g., alert type 5, if the BSI ECU determines 1561 that the steering sensor is detecting a right turn. If the BSI ECU determines that the steering sensor is not detecting a right turn, then the BSI ECU generates an alert 1553, e.g., alert type 2 if the BSI ECU determines 1562 that the right turning signal is not on and generates an alert 1563, e.g., alert type 6, if the BSI ECU determines 1562 that the right turning signal is on.

FIG. 21 summarizes various types of alerts that can be used in a blind spot indication system operating in conjunction with an eye gaze detection system in accordance with one embodiment. Along with providing no alert, the six alerts in FIG. 21 indicate a range of possible responses for the BSI system based on circumstance information and eye gaze vector information. This is in contrast to the existing systems described above which are only able to provide two different alert types (three counting no alert). The added alerts of different types are used to provide complex responses to external car circumstances based on the determined location of the driver's gaze.

Depending upon the danger posed to the driver's vehicle, the provided alert can vary in several dimensions. For example, the alert may be in audio or visual form, the alert may vary in audible or visual intensity, the location of the audio or visual alert may change, and/or the alert may be constant, or periodic, or aperiodic form. By permuting these different variables for the alert, many different alert types are possible. It will be apparent that many other types of alerts can be used without departing from the scope.

The BSI system makes use of these different types of alerts to tailor the alert provided to the vehicle's circumstances and the driver's location of gaze. For example, alert types 1 and 4 provide driver's side alerts. However whether these alerts will even be provided will depend on whether the driver's knowledge of the external threat. The driver's knowledge of the external threat on the based on whether the driver gaze is determined to be looking out the driver's side window.

The BSI system using eye gaze vector information can not only determine when to provide an alert, but also when not to provide an alert. This way, if the driver is paying attention to the threat perceived by the BSI's proximity sensors, no alert is provided. As a result, the BSI system is able to cut down the number of unnecessary warnings provided to the driver.

Driver Experience System

In some embodiments, the human machine interface additionally comprises a driver experience system. The driver experience system tracks a driver's driving to determine an experience level of the driver. The experience level of the driver reflects the driving skill of the driver. Based on this experience level, the driver experience system can alter what information is presented to the driver. If the driver is inexperienced, the HMI may provide additional alerts as well as helpful information to assist the driver. The HMI system may also lock out some of the vehicle's infotainment systems in order to help keep the driver focused on the road. In contrast, if the driver is experienced, the HMI may provide less information, may reduce the number and intensity of alerts, and will not lock out infotainment systems to the same degree as with an inexperienced driver.

Figure 22:
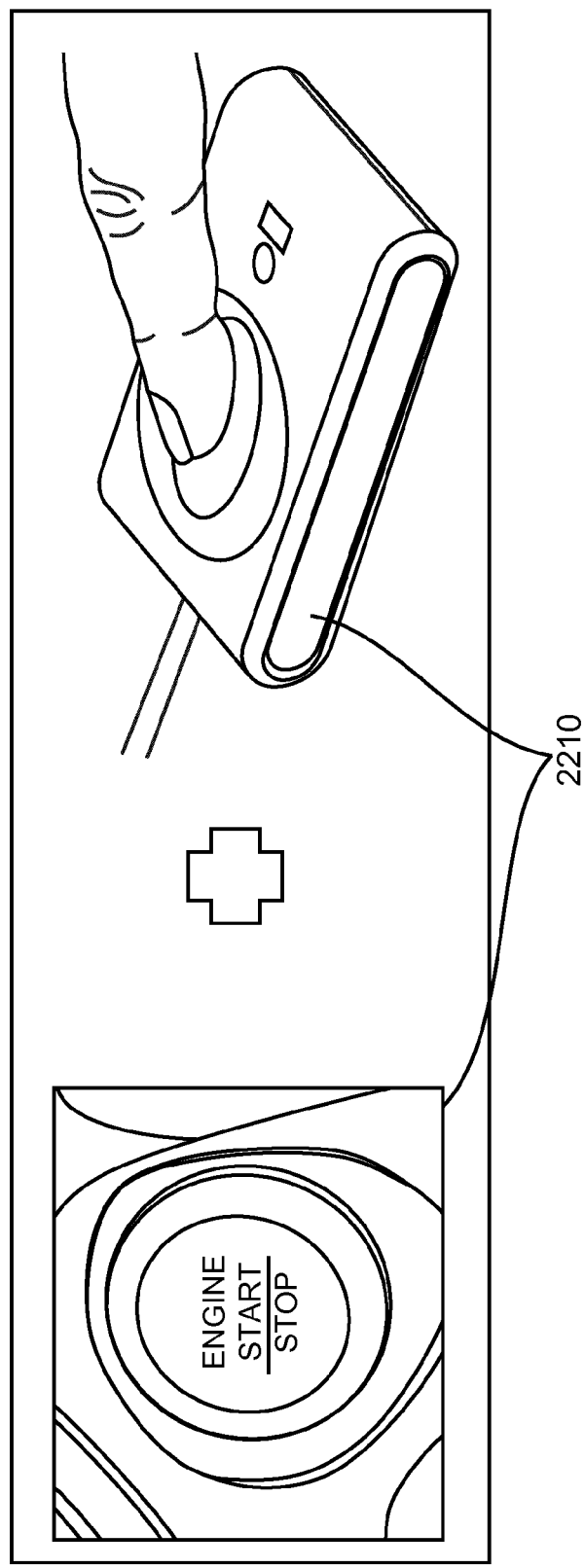
FIG. 22 illustrates a fingerprint reader system incorporated into an engine start/stop button in accordance with one embodiment.

FIG. 22 illustrates a fingerprint reader system incorporated into an engine start/stop button 2210 in accordance with one embodiment. The driver experience system receives signals from the fingerprint reader system in order to identify the driver of the vehicle. The driver's identity is used to track the driver and determine a driver experience level (or experience level score).

In one embodiment, the fingerprint reader system 2210 may comprise a conventional fingerprint reader can be used such as a DIGITAL PERSONA PRO that is commercially available from Digital Persona, Inc in Redwood City, Calif. In alternate embodiments other personal identification systems can be used to determine the identity of the driver, for example using a key fob or having the driver input an identifier. The driver experience system may include a processor having storage and/or memory capable of storing computer program instructions that when executed by a processor perform various functions described herein, and may be part of the vehicle's electronic control unit (ECU).

Figure 23:
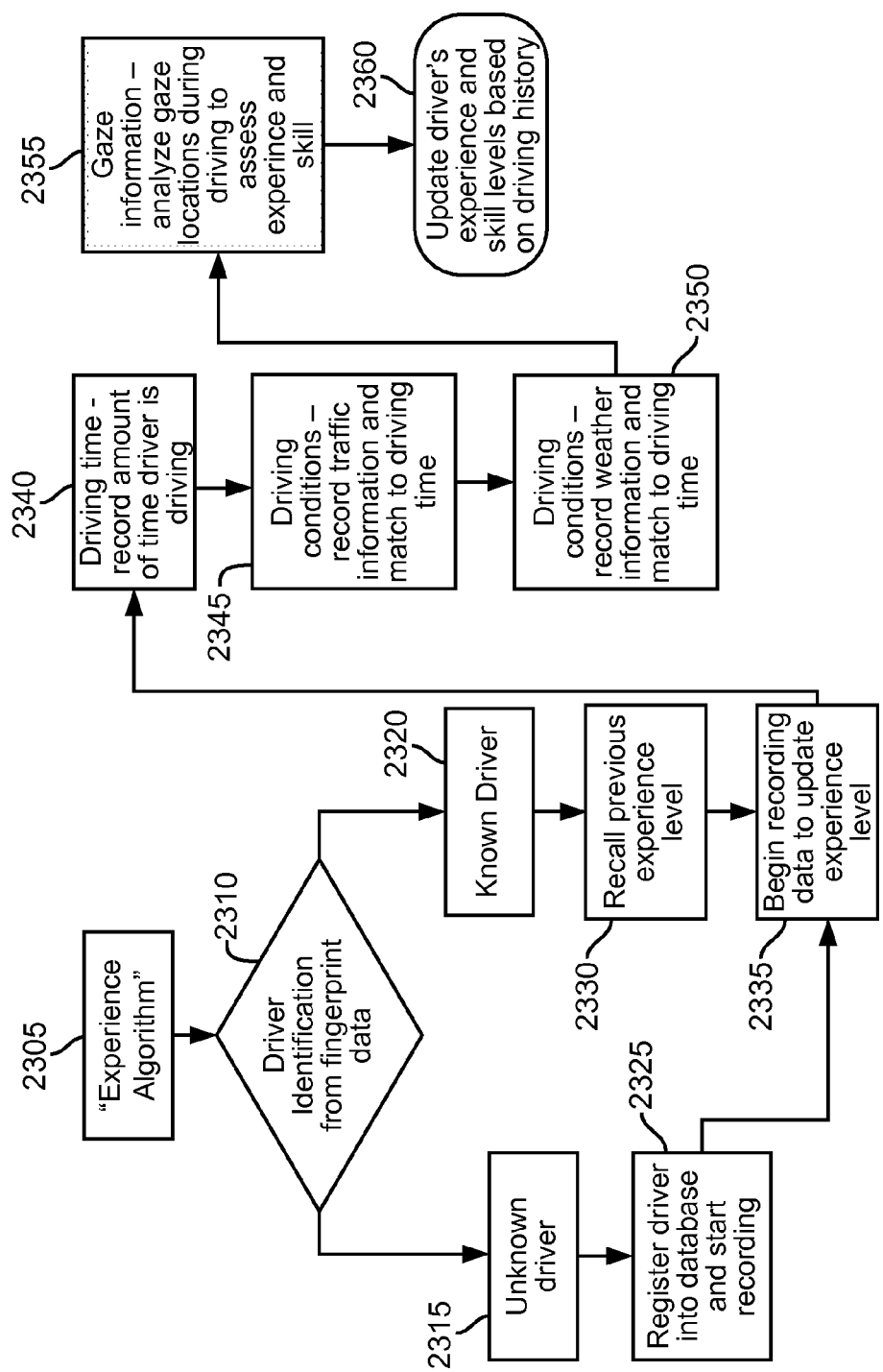
FIG. 23 is a flowchart of the operation of a driver experience system determining a driver experience level using eye gaze vector information in accordance with one embodiment.

FIG. 23 is a flowchart of the operation of a driver experience system determining a driver experience level using eye gaze vector information in accordance with one embodiment. The driver experience system identifies the driver as either a known driver 2320 or an unknown driver 2315. If the driver is a previously unknown driver the driver experience system registers the driver into a database 2325 that can be stored locally in the storage or remotely, e.g., at a remote server using wireless communication from the vehicle. The driver experience system then begins recording data 2335 in order to create an experience level for the driver. If the driver is known 2320 the driver experience system retrieves 2330 the known driver's experience information and level and begins recording data 2335 to update the experience level.

Examples of the type of data recorded and used to create an experience level or score include the driving time 2340, i.e., the amount of time a driver spends driving, driving conditions 2345 such as traffic information and weather information 2350 that can be matched to driving time in order to determine how much time a driver has spent driving in various driving conditions. Driving condition data is generated from on-vehicle sensors, e.g., windshield wipers, thermometer, anti-lock brakes, velocity, surrounding vehicles and their speed based upon on board radar. Driving condition data can also include information from external sources, e.g., from third party traffic data and/or weather information available via a wireless communication network, e.g., cellular networks, satellite communication networks. Driving data also incorporates gaze information 2355. All of this data is combined to update 2360 the driver's experience level.

Figure 24:
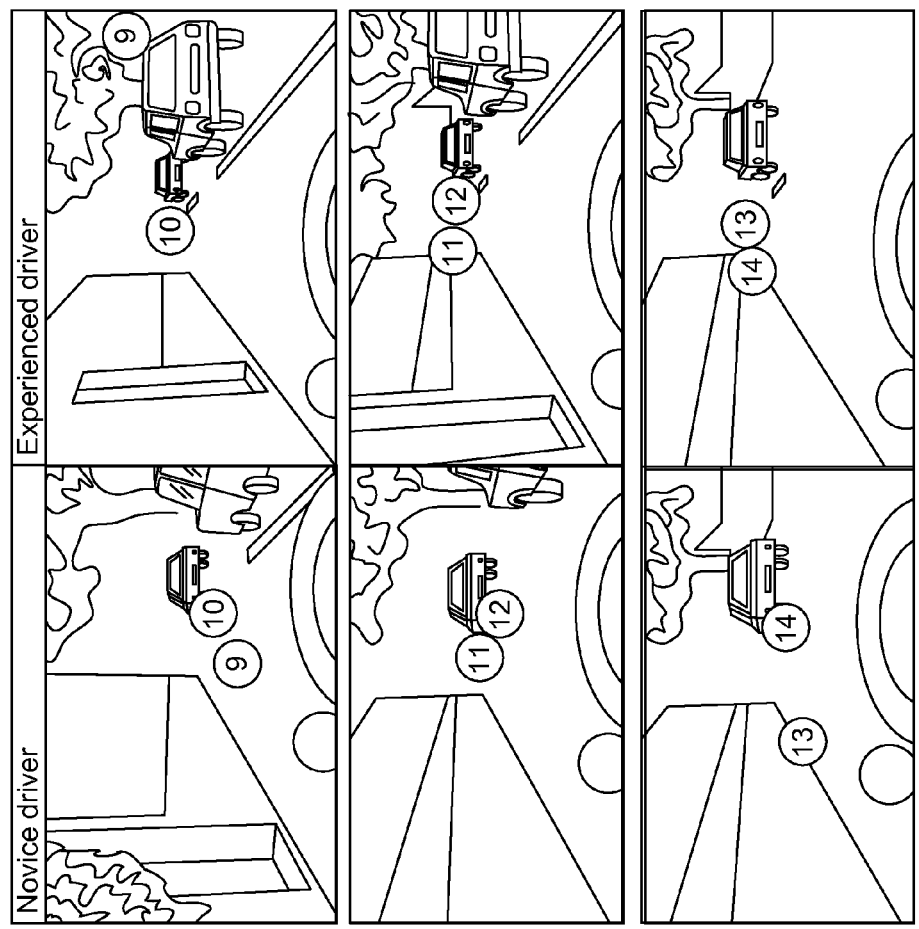
FIG. 24 illustrates an example of additional factors that can be considered in determining the experience level of a driver in accordance with one embodiment.

FIG. 24 illustrates an example of additional factors that can be considered in determining the experience level of a driver in accordance with one embodiment. The driver experience system may also use eye gaze vector information from the eye gaze detection system to determine the driver experience level. In one embodiment, eye gaze vector information can be used to review the amount of time a driver is looking to the sides versus using their peripheral visions, which in turn can indicate the amount of experience and skill that the driver has. This information can be recorded and analyzed and be included as part of (or the entire component of) a driver's skill and experience score. The eye gaze detection system can also be used to determine the amount of time a driver spends looking into each of the vehicle's mirrors as well as a driver's reaction time to adjacent vehicles, where such vehicles can be identified by on-board radar systems, as described above. In FIG. 24, the eye movement of the novice driver shows a driver focused on items that are not as important to the safe operation of the vehicle as the items focused on by the experienced driver. As shown in FIG. 24, the experienced driver's eyes are looking at an upcoming turn, for example.

Figure 25:
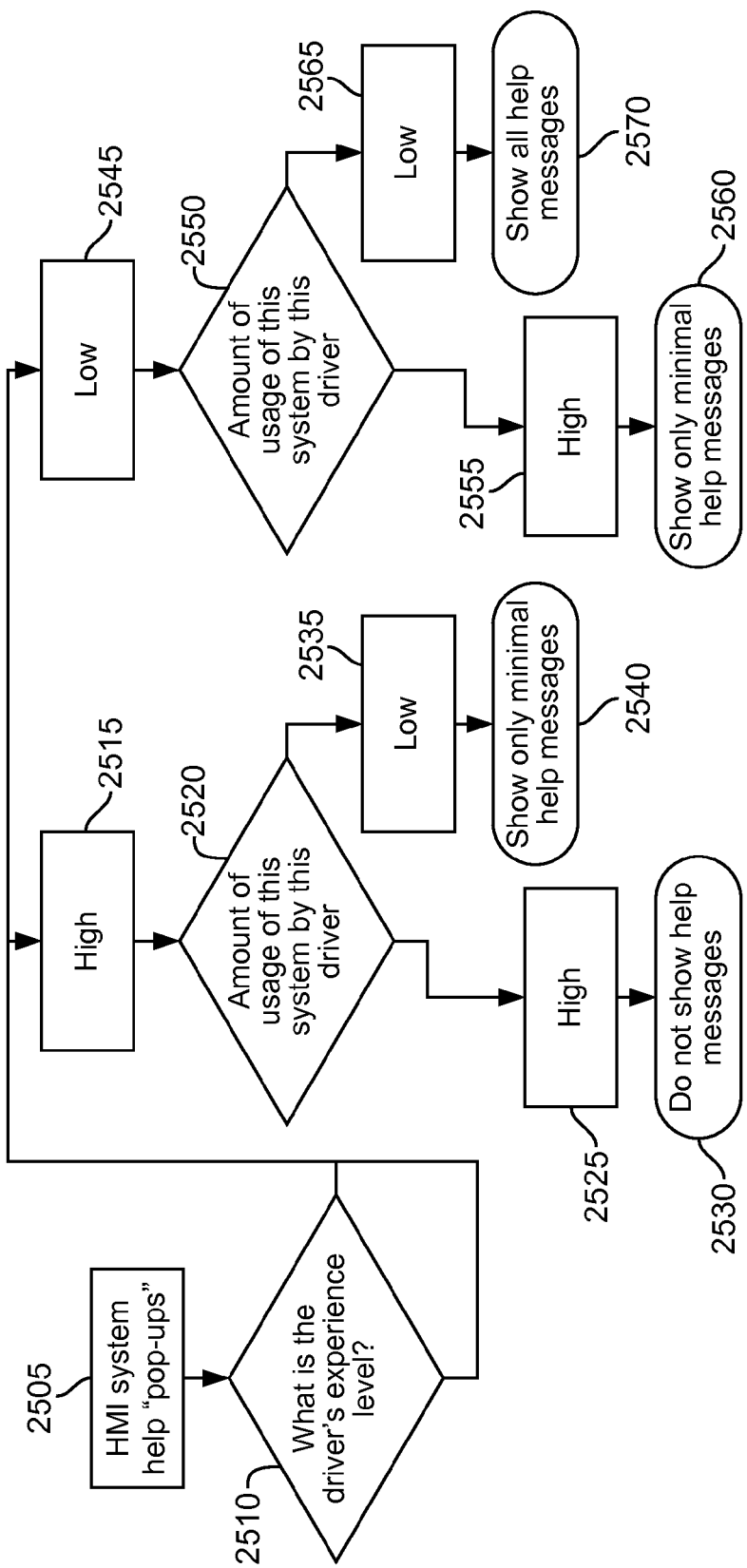
FIG. 25 is a flowchart of an example of using an experience level of a driver to determine whether helpful information is displayed to the driver in accordance with one embodiment.

FIG. 25 is a flowchart of an example of using an experience level of a driver to determine whether helpful information is displayed to the driver in accordance with one embodiment. In one embodiment, the helpful information is provided through a HMI help module of the vehicle's interface software 2505. In one example embodiment, the help information may include help "pop-ups". To determine how much helpful information to display, the driver experience system first identifies the experience level of the driver 2510. If the experience level is high 2515 then the driver experience system determines 2520 the amount of usage of HMI help by this particular driver. If the level of previous usage of this system is high 2525 then the system will not show help messages 2530, if the level of usage is low 2535 then only minimal help messages will be shown 2540. If the experience level of the driver is low 2545 and the amount of usage of HMI help 2550 is low 2565 then all messages will be shown to the user 2570, and if the amount of usage of this system 2550 is high 2555 then only minimal help messages will be shown 2560. In one embodiment the experience level score is granular in order to identify more differentiations between the experience level of drivers.

Figure 26:
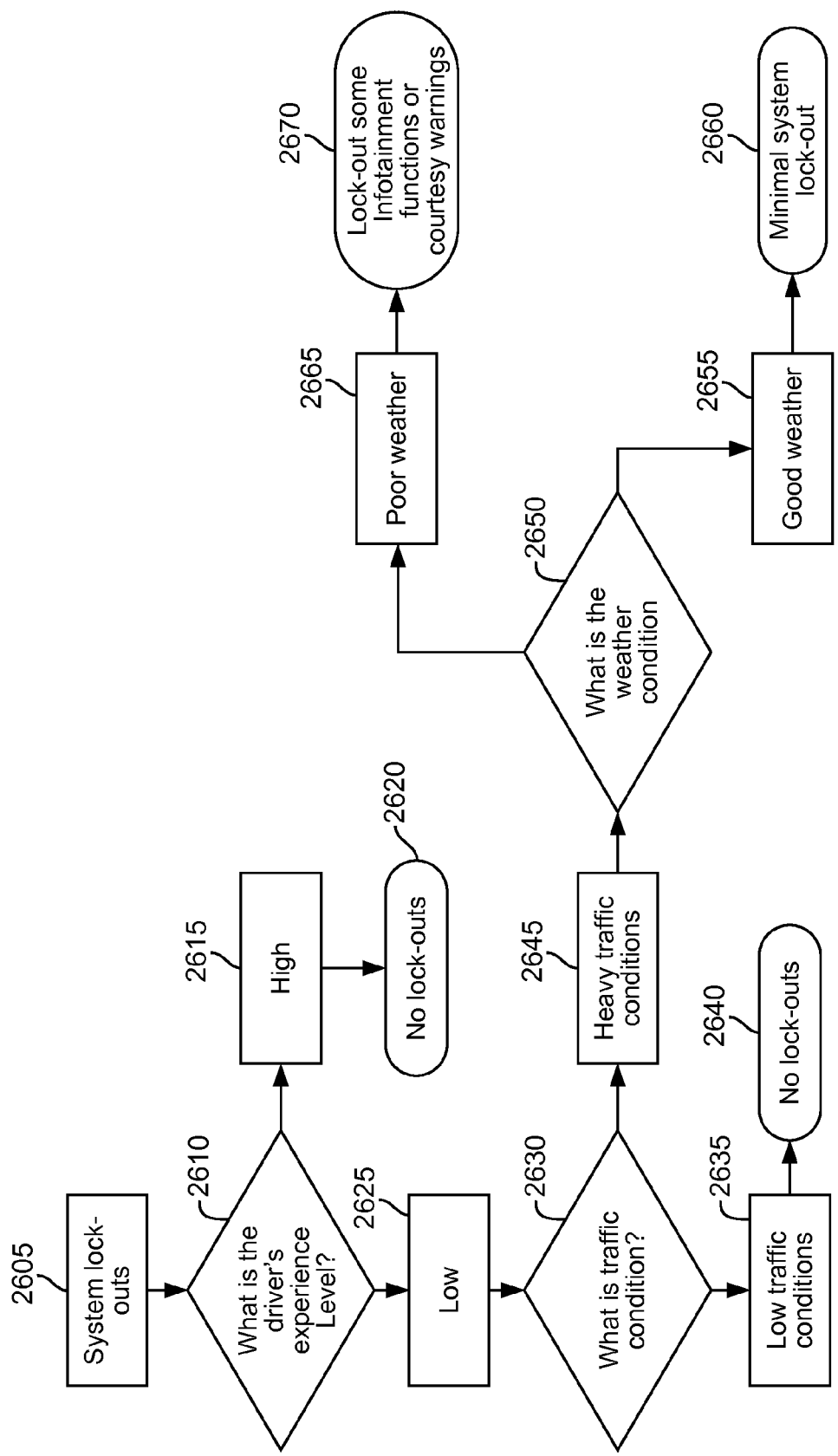
FIG. 26 is a flowchart of an example of using an experience level of a driver to determine whether certain information is displayed to the driver in accordance with one embodiment.

FIG. 26 is a flowchart of an example of using an experience level of a driver to determine whether certain information is displayed to the driver in accordance with one embodiment. The driver experience system may lock information out 2605 in order to keep information provided by the HMI, vehicle infotainment systems, or courtesy warnings from interfering with the driver's focus on the driving. In one embodiment, the driver experience system uses the driver's experience level and traffic information 2610 to determine whether to lock out a driver from accessing or viewing certain information. If a driver has a high experience level 2615 then no information is locked out 2620. If the driver experience level is low 2625 then the driver experience system (or another unit in the vehicle, e.g., in the ECU), determines the traffic conditions 2630. If there is a low traffic condition 2635 then there are no information is locked out 2640. However, if traffic conditions are heavy 2645 then the driver experience system identifies the weather conditions 2650. If the weather conditions are good 2655 then there are minimal system lock-outs 2660. If the weather condition is poor 2665 then the driver is locked out from more information 2670.

The proposed driver experience system allows for customization of vehicle features such as, for example, the accident prevention system or HMI, due to the fact that the driver experience system knows who the driver is. Based on this knowledge and information about the driver's experience as well as current driving conditions, the driver experience system is able to augment the driver's ability to complete driving tasks. By using this information the vehicle can reduce the amount of help the HMI gives the driver, reduce the number of warnings provided by the accident prevention system, reduce the display of less important information and certain features. As a result, the driver experience system is able to reduce the number of distractions provided driver.

Other Features

Incorporating the eye gaze detection system with the accident prevention system allows for several features. In one embodiment, the accident prevention system adjusts based on a measurement of the driver's cognitive load. It is known that as your cognitive load increases, your pupils dilate slightly versus a non-loaded state. In one embodiment, the eye gaze detection system is additionally configured to measure the driver's eye dilation in order to monitor the driver's cognitive state. In order to establish a baseline of data, the eye gaze detection system records the driver's eye dilation size and compares that size to the size recorded during other external activities. For example, the system can read the data from the ambient light sensor and monitor the current operating task to begin to establish baseline data. Once baseline data is accumulated for the driver, the eye gaze detection system can reduce non-essential warnings and lock out complex functions, e.g., infotainment functions such as IPOD music searching, when periods of high cognitive load are detected.

In another embodiment, after a vehicle accident the eye gaze detection system is additionally configured to determine if the driver is conscious or not. The system would receive a crash signal from a supplemental restraint system (SRS) system, indicating that a crash has occurred. In response to receiving the crash signal, the system then determines whether or not the driver's eyes are open or not. If the system determines that the driver is not conscious, the system initiate an automated phone call with a pre-recorded message to an emergency services system, e.g., 911. In this embodiment, the eye gaze detection system works in conjunction with a phone connected to the system (via Bluetooth or some similar technology). In one embodiment, the eye gaze detection system is additionally configured to incorporate location information from a navigation system into the pre-recorded message.

In another embodiment, the eye gaze detection system can use eye gaze information to change where the HMI displays information. For example, for alerts, the eye gaze detection system can cause the alert to be displayed where the driver is looking. For example, if the driver is looking at an audio system display, a low fuel alert could be re-routed to be displayed on the audio system display. The eye gaze detection system may also be configured to change the information that the driver is looking at. The system could increase the size of the text and/or icons where the driver is looking to increase their readability. The system may also change the brightness and/or contrast of the text and/or icons that the driver is looking at. In one embodiment, the changes are subtle so as not to overwhelm or distract the driver.

In another embodiment, the eye gaze detection system is configured to adjust the vehicle's mirror positions based upon the position of the eyes of driver. Using eye gaze vector information, the system can automatically adjust the side view mirrors into positions suggested by the Society of Automotive Engineers (SAE). The eye gaze detection system would implement a mirror algorithm based on the current SAE formula for calculating mirror visibility. The suggested position of the mirrors could be used as a starting point for fine adjustment by the driver.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities.

Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions could be embodied in software, firmware or hardware, and when embodied in software, could be downloaded to reside on and be operated from different platforms used by a variety of operating systems. The embodiment can also be in a computer program product which can be executed on a computing system.

The exemplary embodiments also relate to an apparatus for performing the operations herein. This apparatus may be specially constructed for the purposes, e.g., a specific computer in a vehicle, or it may comprise a general-purpose computer selectively activated or reconfigured by a computer program stored in the computer which can be in a vehicle. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the exemplary embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope of the embodiments.

While particular embodiments and applications have been illustrated and described herein, it is to be understood that the embodiment is not limited to the precise construction and components disclosed herein and that various modifications, changes, and variations may be made in the arrangement, operation, and details of the methods and apparatuses without departing from the spirit and scope.

What is claimed is:

1. A method of providing an accident warning alert in a vehicle comprising:
    detecting a location of at least one lane marker, a location of an adjacent vehicle, and a location of the vehicle relative to the at least one lane marker based on a proximity sensor;
    determining an eye gaze vector based on an eye gaze detector and determining a current pupil size of a driver;
    gathering, using the eye gaze vector determined from the eye gaze detector, driver experience information based on an amount of time the driver uses peripheral vision and the driver's reaction time to the adjacent vehicle, wherein the driver experience information is further based on an amount of time the driver has spent driving in a current weather condition;
    determining, using a processor, a metric of driver awareness of the vehicle location with respect to the location of the at least one lane marker using the eye gaze vector;
    determining, using the processor, a vehicle accident risk based on the relative location of the vehicle and the at least one lane marker;
    locking out a vehicle infotainment system, using the processor, the locking out based on the vehicle accident risk, the driver experience level, the current weather condition, a comparison of the current pupil size of the driver to a baseline pupil size for the driver, and the metric of the driver awareness of the vehicle location with respect to the location of the at least one lane marker and the adjacent vehicle; and
    activating a vehicle alert, using the processor, the vehicle alert based on the vehicle accident risk, the driver experience level, and the metric of the driver awareness of the vehicle location with respect to the location of the at least one lane marker.

2. The method of claim 1 further comprising:
    activating a car control function based on the vehicle accident risk, the driver experience level, and the driver's awareness of the vehicle location.

3. The method of claim 2 wherein the car control function is at least one of a vehicle braking function, a steering wheel function, or an infotainment control function.

4. The method of claim 1 wherein determining the vehicle accident risk further comprises:
    determining a location of a nearby object; and
    determining whether the location of the nearby object is within a field of view of the eye gaze vector.

5. The method of claim 1 wherein the vehicle alert comprises a first visual alert when the metric of driver awareness of the vehicle location and the vehicle accident risk are above a first threshold.

6. The method of claim 5 wherein the vehicle alert comprises a second visual alert when the metric of driver awareness of the vehicle location and the vehicle accident risk are above a second threshold.

7. The method of claim 6 wherein the vehicle alert comprises an auditory alert when the metric of driver awareness of the vehicle location and the vehicle accident risk are above a third threshold.

8. The method of claim 4 wherein the nearby object is at least one of a second vehicle, or a fixed object.

9. The method of claim 8 further comprising detecting the nearby object velocity using the proximity sensor, and wherein determining the vehicle accident risk is further based on the nearby object velocity.

10. A system of providing an accident warning alert in a vehicle comprising:
- an eye gaze detector configured to receive an eye gaze vector from a driver and a current pupil size of the driver, the eye gaze detector further configured to determine driver experience based on an amount of time the driver uses peripheral vision and the driver's reaction time to an adjacent vehicle, wherein the driver experience is further based on an amount of time the driver has spent driving in a current weather condition;
- a proximity sensor configured to detect a location of at least one lane marker, a location of the adjacent vehicle, and a location of the vehicle relative to the at least one lane marker;
- an electronic control unit configured to determine a vehicle accident risk based on the relative location of the vehicle and the at least one lane marker;
- the electronic control unit further configured to lock out a vehicle infotainment system based on the vehicle accident risk, the driver experience level, the current weather condition, a comparison of the current pupil size of the driver to a baseline pupil size for the driver, and the metric of the driver awareness of the vehicle location with respect to the location of the at least one lane marker and the adjacent vehicle; and
- the electronic control unit further configured to activate a vehicle alert based on the vehicle accident risk, the driver experience level, and a metric of driver awareness of the vehicle location with respect to the location of the at least one lane marker determined using the eye gaze vector.

11. The system of claim 10 wherein the electronic control unit is further configured to activate a car control function based on the vehicle accident risk, the driver experience level, and the metric of driver awareness of the vehicle location.

12. The system of claim 11 wherein the car control function is at least one of a vehicle braking function, a steering wheel function, or an infotainment control function.

13. The system of claim 10 wherein the determination of the vehicle accident risk is further based on determining a location of a nearby object and determining whether the location of the nearby object is within a field of view of the eye gaze vector.

14. The system of claim 10 wherein the vehicle alert comprises a first visual alert when the metric of driver awareness of the vehicle location and the vehicle accident risk are above a first threshold.

15. The system of claim 14 wherein the vehicle alert comprises a second visual alert when the metric of driver awareness of the vehicle location and the vehicle accident risk are above a second threshold.

16. The system of claim 15 wherein the vehicle alert comprises an auditory alert when the metric of driver awareness of the vehicle location and the vehicle accident risk are above a third threshold.

17. The system of claim 13 wherein the nearby object is at least one of a second vehicle, or a fixed object.

18. The system of claim 17 wherein the proximity sensor is further configured to detect a nearby object velocity, and wherein the vehicle accident risk and is further based on the nearby object velocity.

19. The method of claim 1 wherein the driver experience is determined based on the amount of time the driver uses peripheral vision in relation to an upcoming road feature.

20. A method of providing an accident warning alert in a vehicle comprising:
- detecting a location of at least one lane marker, a location of an adjacent vehicle, and a location of the vehicle relative to the at least one lane marker based on a proximity sensor;
- determining an eye gaze vector based on an eye gaze detector and determining a current pupil size of a driver;
- gathering, using the eye gaze vector determined from the eye gaze detector, driver experience information based on an amount of time the driver uses peripheral vision, the driver's reaction time to the adjacent vehicle, and an amount of time the driver has spent driving in a current weather condition;
- determining, using a processor, a metric of driver awareness of the vehicle location with respect to the location of the at least one lane marker using the eye gaze vector;
- determining, using the processor, a vehicle accident risk based on the relative location of the vehicle and the at least one lane marker;
- locking out a vehicle infotainment system, using the processor, the locking out based on the vehicle accident risk, the driver experience level, the current weather condition, a comparison of the current pupil size of the driver to a baseline pupil size for the driver, and the metric of the driver awareness of the vehicle location with respect to the location of the at least one lane marker and the adjacent vehicle; and
- activating a vehicle alert, using the processor, the vehicle alert based on the vehicle accident risk, the driver experience level, and the metric of the driver awareness of the vehicle location with respect to the location of the at least one lane marker,
- wherein the vehicle alert comprises a first visual alert when the metric of driver awareness of the vehicle location and the vehicle accident risk are above a first threshold.

* * * * *